(12) United States Patent
Okazaki et al.

(10) Patent No.: US 12,445,023 B2
(45) Date of Patent: Oct. 14, 2025

(54) MAGNETIC GAP LENGTH ESTIMATING DEVICE, MAGNETIC GAP LENGTH ESTIMATING METHOD, AND DRIVING DEVICE FOR ROTATING ELECTRIC MACHINE

(71) Applicants: Mitsubishi Electric Corporation, Tokyo (JP); National University Corporation YOKOHAMA National University, Yokohama (JP)

(72) Inventors: Kodai Okazaki, Tokyo (JP); Kan Akatsu, Yokohama (JP)

(73) Assignees: MITSUBISHI ELECTRIC CORPORATION, Tokyo (JP); NATIONAL UNIVERSITY CORPORATION YOKOHAMA NATIONAL UNIVERSITY, Yokohama (JP)

( * ) Notice: Subject to any disclaimer, the term of this patent is extended or adjusted under 35 U.S.C. 154(b) by 211 days.

(21) Appl. No.: 18/282,240

(22) PCT Filed: Mar. 24, 2021

(86) PCT No.: PCT/JP2021/012144
§ 371 (c)(1),
(2) Date: Sep. 15, 2023

(87) PCT Pub. No.: WO2022/201344
PCT Pub. Date: Sep. 29, 2022

(65) Prior Publication Data
US 2024/0162790 A1 May 16, 2024

(51) Int. Cl.
*H02K 11/33* (2016.01)
*H02K 3/28* (2006.01)
*H02K 11/26* (2016.01)

(52) U.S. Cl.
CPC ............... *H02K 11/33* (2016.01); *H02K 3/28* (2013.01); *H02K 11/26* (2016.01); *H02K 2201/03* (2013.01); *H02K 2213/03* (2013.01)

(58) Field of Classification Search
CPC ...... G01R 31/343; H02K 11/26; H02K 11/33; H02K 15/16; H02K 2201/03; H02K 2213/03; H02K 3/28; H02P 23/14
USPC ........................................................ 310/68 D
See application file for complete search history.

(56) References Cited

U.S. PATENT DOCUMENTS 5,510,689 A * 4/1996 Lipo ..................... H02P 6/187
318/807
5,936,370 A * 8/1999 Fukao ................. F16C 32/0448
318/560

(Continued)

FOREIGN PATENT DOCUMENTS

JP 08223875 A * 8/1996
JP 3044539 B2 5/2000

(Continued)

OTHER PUBLICATIONS

International Search Report and Written Opinion mailed on Jun. 15, 2021, received for PCT Application PCT/JP2021/012144, filed on Mar. 24, 2021, 8 pages including English Translation.

*Primary Examiner* — Alex W Mok
(74) *Attorney, Agent, or Firm* — XSENSUS LLP

(57) ABSTRACT

Provided is a magnetic gap length estimating device in which neither a current sensor nor a current load is necessary, and a voltage at a connection-wire neutral point does not need to be measured. A magnetic gap length estimating device for estimating a magnetic gap length in an M-group N-phase rotating electric machine to be driven by an inverter includes: a voltage acquiring unit which acquires a no-load-induced line-to-line voltage induced under no load; and a magnetic gap estimating unit. The magnetic gap estimating (Continued)

unit includes: a spectrum analysis unit which converts the no-load-induced line-to-line voltage acquired by the voltage acquiring unit into amplitudes and phases for respective frequencies; a frequency analysis unit which extracts amplitudes and phases of a fundamental wave component and an $N^{th}$-order harmonic component of the no-load-induced line-to-line voltage; and an estimating-and-calculating unit which estimates the magnetic gap length.

12 Claims, 21 Drawing Sheets

(56) References Cited

U.S. PATENT DOCUMENTS

| | | | | |
|---|---|---|---|---|
| 7,323,843 | B2 * | 1/2008 | Tu | H02K 15/16 |
| | | | | 324/207.13 |
| 9,571,017 | B2 * | 2/2017 | Hirotani | H02P 25/22 |
| 10,267,860 | B2 * | 4/2019 | Athikessavan | G01R 31/343 |
| 2006/0261774 | A1 * | 11/2006 | Tu | H02K 11/20 |
| | | | | 318/611 |
| 2007/0257575 | A1 * | 11/2007 | Vollmer | H02K 3/28 |
| | | | | 310/156.01 |

FOREIGN PATENT DOCUMENTS

| | | | | |
|---|---|---|---|---|
| JP | 3561882 | B2 | 9/2004 | |
| JP | 2008514166 | A * | 5/2008 | H02K 3/28 |
| JP | 6193377 | B2 | 9/2017 | |

* cited by examiner

IN CASE OF $|U1| \leq |V3|$

IN CASE OF $|U1| \geq |V3|$

MAGNETIC GAP LENGTH ESTIMATING DEVICE, MAGNETIC GAP LENGTH ESTIMATING METHOD, AND DRIVING DEVICE FOR ROTATING ELECTRIC MACHINE

CROSS-REFERENCE TO RELATED APPLICATION

The present application is based on PCT filing PCT/JP2021/012144, filed Mar. 24, 2021, the entire contents of which are incorporated herein by reference.

TECHNICAL FIELD

The present disclosure relates to a magnetic gap length estimating device, a magnetic gap length estimating method, and a driving device for a rotating electric machine.

BACKGROUND ART

Rotating electric machines such as electric motors suffer: static eccentricity in which the central axis of a rotor and the central axis of a stator deviate from each other; and dynamic eccentricity in which the shape center and the rotation center of the rotor deviate from each other. Owing to such eccentricities, magnetic unbalance occurs in a magnetic gap between the rotor and the stator. The magnetic unbalance causes, for example, vibration and noise at a low frequency. The eccentricities that cause the magnetic unbalance in the magnetic gap occur in a step of assembling a rotor, a step of inserting the rotor into a stator, a step of sealing a rotation shaft with a bracket after the insertion, or the like of a manufacturing process for a rotating electric machine. In addition, such eccentricities occur also owing to, for example, a malfunction caused in a bearing portion of the rotor during drive of the rotating electric machine. Therefore, it is difficult to completely prevent occurrence of each of the eccentricities in the rotating electric machine. This makes it necessary to employ: a technique for detecting and compensating for the eccentricity in a manufacturing process; and a technique for detecting the eccentricity by analyzing current and voltage of a rotating electric machine during drive.

As a method for detecting the eccentricity in a rotating electric machine, a technique for estimating the amount of eccentricity by detecting a circulation current flowing through parallel wiring in an electric motor to which a magnetic bearing system has been applied, is proposed (see, for example, Patent Document 1). In addition, as another method, a technique for estimating the amount of eccentricity by detecting a three-phase induced voltage with use of a position control winding in a bearingless motor, is proposed (see, for example, Patent Document 2). Further, as another method, a technique for estimating the amount of eccentricity by detecting a phase voltage and a phase current of an inverter that supplies power to an induction machine being driven, is proposed (see, for example, Patent Document 3).

CITATION LIST

Patent Document

Patent Document 1: Japanese Patent No. 6193377
Patent Document 2: Japanese Patent No. 3044539
Patent Document 3: Japanese Patent No. 3561882

SUMMARY OF THE INVENTION

Problem to be Solved by the Invention

In the conventional method for estimating the amount of eccentricity by detecting a circulation current flowing through parallel wiring, a current sensor that detects a circulation current is indispensable. Therefore, a problem arises in that employment of this method in eccentricity inspection during a manufacturing process leads to upsizing of an inspection device. In addition, this method goes against the recent trend of providing driving systems for rotating electric machines equipped with no current sensors, for the purpose of downsizing. In addition, in the method for estimating the amount of eccentricity by detecting a three-phase induced voltage, a current load is necessary for detecting the voltage. Therefore, a problem arises in that employment of this method in eccentricity inspection during a manufacturing process also leads to upsizing of the inspection device. Further, in the method for estimating the amount of eccentricity by detecting a phase voltage and a phase current of the inverter, a voltage at a connection-wire neutral point needs to be measured in order to measure the phase voltage. Therefore, a problem arises in that it is very difficult to employ this method in eccentricity inspection during a manufacturing process. Moreover, a problem arises in that application of this method to a driving system for a rotating electric machine leads to upsizing of the system.

The present disclosure has been made to solve the above problems, and an object of the present disclosure is to provide a magnetic gap length estimating device in which neither a current sensor nor a current load is necessary, and a voltage at a connection-wire neutral point does not need to be measured.

Means to Solve the Problem

A magnetic gap length estimating device according to the present disclosure is a magnetic gap length estimating device for estimating a magnetic gap length in an M-group N-phase rotating electric machine to be driven by an inverter where M represents a natural number and N represents a natural number not smaller than 2, the rotating electric machine being formed by connection wires with a phase difference in electrical angle among phases being 360/N degrees. The magnetic gap length estimating device includes: a voltage acquiring unit which acquires a no-load-induced line-to-line voltage induced between the connection wires under no load; and a magnetic gap estimating unit which estimates the magnetic gap length in the rotating electric machine. The magnetic gap estimating unit includes: a spectrum analysis unit which converts the no-load-induced line-to-line voltage acquired by the voltage acquiring unit into amplitudes and phases for respective frequencies; a frequency analysis unit which extracts amplitudes and phases of a fundamental wave component and an $N^{th}$-order harmonic component of the no-load-induced line-to-line voltage from among the amplitudes and the phases, for the respective frequencies, that have been obtained through the conversion by the spectrum analysis unit; and an estimating-and-calculating unit which estimates the magnetic gap length in the rotating electric machine from the amplitudes and the phases, of the fundamental wave component and the $N^{th}$-order harmonic component of the no-load-induced line-to-line voltage, that have been extracted by the frequency analysis unit.

Effect of the Invention

In the magnetic gap length estimating device according to the present disclosure, the magnetic gap estimating unit includes: the spectrum analysis unit which converts the no-load-induced line-to-line voltage acquired by the voltage acquiring unit into amplitudes and phases for respective frequencies; the frequency analysis unit which extracts amplitudes and phases of a fundamental wave component and an $N^{th}$-order harmonic component of the no-load-induced line-to-line voltage; and the estimating-and-calculating unit which estimates the magnetic gap length in the rotating electric machine. Consequently, neither a current sensor nor a current load is necessary, and a voltage at a connection-wire neutral point does not need to be measured.

DESCRIPTION OF EMBODIMENTS

Figure 1:
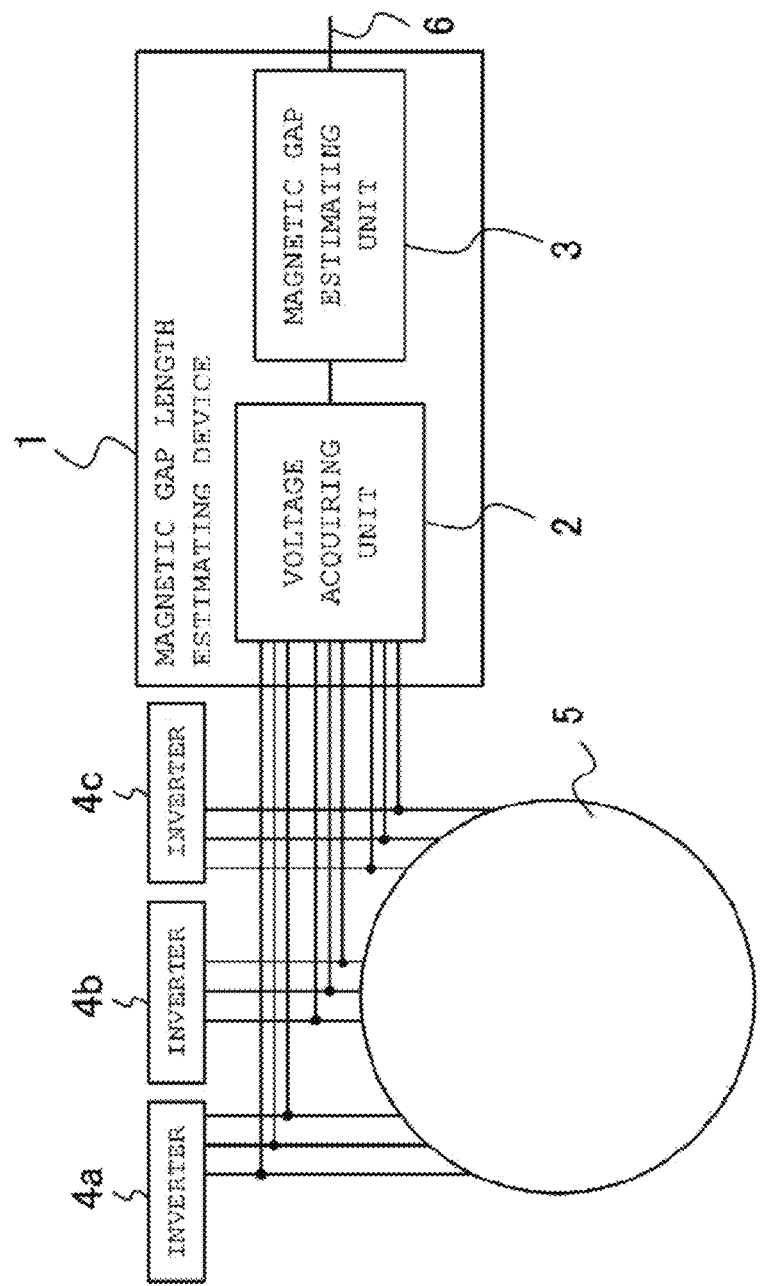
FIG. 1 is a configuration diagram of a magnetic gap length estimating device according to embodiment 1.

Hereinafter, magnetic gap length estimating devices and driving devices for rotating electric machines according to embodiments for carrying out the present disclosure will be described in detail with reference to the drawings. The same or corresponding components in the drawings are denoted by the same reference characters.

Embodiment 1

FIG. 1 is a configuration diagram of a magnetic gap length estimating device according to embodiment 1. The magnetic gap length estimating device according to the present embodiment is a magnetic gap length estimating device designed to perform measurement on a three-group three-phase rotating electric machine to be driven by inverters. A magnetic gap length estimating device 1 in the present embodiment has a voltage acquiring unit 2 and a magnetic gap estimating unit 3. The voltage acquiring unit 2 acquires voltages of nine connection wires between a rotating electric machine 5 and three inverters 4a, 4b, and 4c. The magnetic gap estimating unit 3 estimates a magnetic gap. This magnetic gap estimating unit has an external output terminal 6. If, for example, an external monitor is connected to the external output terminal 6, the state of the magnetic gap can be visualized.

Figure 2:
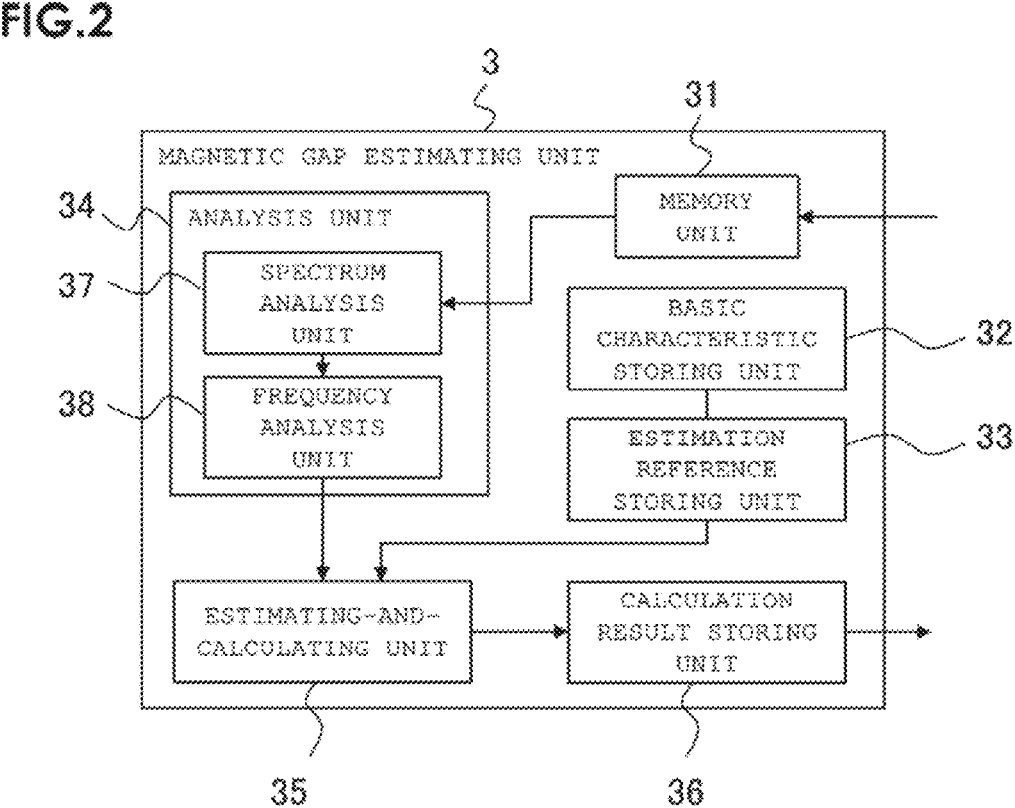
FIG. 2 is a configuration diagram of a magnetic gap estimating unit according to embodiment 1.

FIG. 2 is a configuration diagram of the magnetic gap estimating unit 3 in the present embodiment. The magnetic gap estimating unit 3 has: a memory unit 31 in which data transmitted from the voltage acquiring unit 2 is saved; a basic characteristic storing unit 32 storing therein a basic characteristic of the rotating electric machine; an estimation reference storing unit 33 storing therein data serving as a reference for estimating a magnetic gap length; an analysis unit 34 which extracts amplitudes and phases of a fundamental wave component and an $N^{th}$-order harmonic component of a no-load-induced line-to-line voltage on the basis of the data transmitted from the memory unit 31; an estimating-and-calculating unit 35 which estimates and calculates a magnetic gap length on the basis of the data extracted by the analysis unit 34; and a calculation result storing unit 36 which stores therein a calculation result estimated by the estimating-and-calculating unit 35.

The basic characteristic storing unit 32 stores therein specifications of the rotating electric machine 5 to be subjected to measurement, such as dimensional specifications and a standard rotation speed. The estimation reference storing unit 33 stores therein estimation reference data necessary for estimating a magnetic gap length. The estimation reference data is, for example, the relationship between no-load-induced line-to-line voltage and magnetic gap length in the rotating electric machine 5 to be subjected to measurement, or the like. The estimation reference data is acquired in advance through measurement or calculated in advance through theoretical calculation. Here, the no-load-induced line-to-line voltage is a voltage that is induced between coils when the rotating electric machine is rotated at a rated rotation speed in a state where: current is not caused to flow through an armature; and no load is applied. Hereinafter, the no-load-induced line-to-line voltage is simply referred to as a line-to-line voltage.

The analysis unit 34 includes: a spectrum analysis unit 37 which converts the data acquired from the memory unit 31 into information about amplitudes and phases for respective frequencies; and a frequency analysis unit 38 which extracts amplitudes and phases of a fundamental wave component and an $N^{th}$-order harmonic component of a phase voltage from among the amplitudes and the phases for the respective frequencies. The spectrum analysis unit 37 performs conversion into the information about the amplitudes and the phases with use of, for example, an algorithm of fast Fourier transform. However, another algorithm may be used as long as the algorithm can realize the same spectrum analysis.

Figure 3:
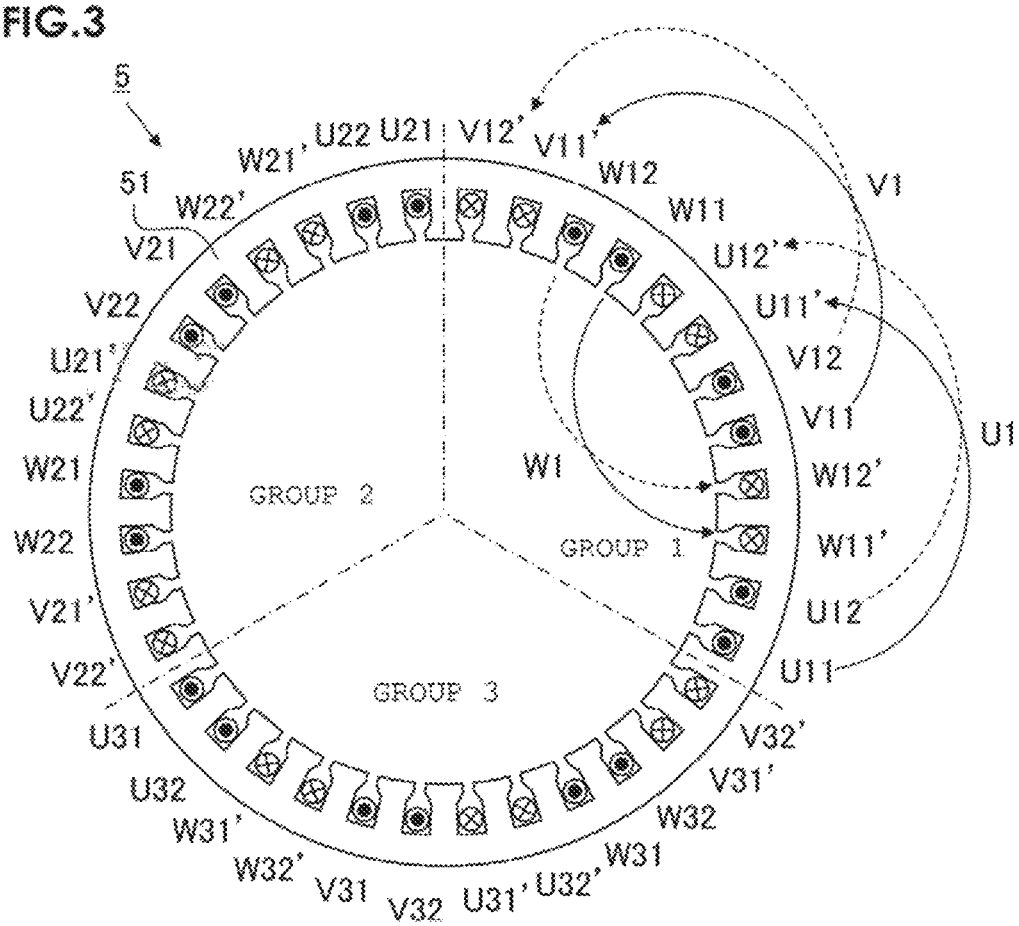
FIG. 3 is a configuration diagram of a rotating electric machine according to embodiment 1.

FIG. 3 is a configuration diagram of the rotating electric machine 5 that is subjected to measurement, in the present embodiment. The rotating electric machine 5 shown in FIG. 3 is a three-group three-phase rotating electric machine having a six-pole thirty-six-slot configuration assumed to be driven by the inverters. It is noted that no rotor is shown in FIG. 3. A stator 51 has a configuration in which coils are wound independently of one another in three groups, i.e., group 1, group 2, and group 3. The groups are arranged in the circumferential direction of the stator with a phase difference in mechanical angle being 360/3=120°. In FIG. 3, directions of currents flowing through the respective coils are indicated by two types of symbols. A symbol with a round mark in which an X mark is present indicates a direction in which current flows from the nearer side toward the farther side of the drawing sheet, and a symbol with a round mark in which a black circle is present indicates a direction in which current flows from the farther side toward the nearer side of the drawing sheet. The stator 51 of the rotating electric machine 5 in the present embodiment has a distributed-winding structure in which coils are arranged over a plurality of slots. Each of the three groups is formed by three phases, i.e., U, V, and W phases, and each of the phases is formed by two coils. For example, U1 indicating coils of the U phase in group 1 has two coils U11 and U12. In FIG. 3, directions of winding of the respective coils in group 1 are indicated by arrows. Directions of winding of the respective coils in each of group 2 and group 3 are the same as those in group 1. The coils in each of the groups are wound so as to be consecutive in the circumferential direction in the order of the coils of the U, W, and V phases. For example, the coils in group 1 are arranged anticlockwise in the order of U11, U12, W11, W12, V11, and V12. The same arrangement is employed in group 2 and group 3 as well.

That is, if, with M and K being defined as natural numbers and with N being defined as a natural number not smaller than 2, a $k^{th}$ coil of an $n^{th}$ phase in an $m^{th}$ group in an M-group N-phase rotating electric machine in which each of the phases is formed by K coils is written as C(m, n, k), the rotating electric machine 5 in the present embodiment satisfies $1 \leq m \leq M$, $1 \leq n \leq N$, and $1 \leq k \leq K$ and satisfies M=3, N=3, and K=2. The coils of this rotating electric machine 5 are arranged, from group 1, anticlockwise in the order of C(1, 1, 1), C(1, 1, 2), C(1, 2, 1), C(1, 2, 2), C(1, 3, 1), C(1, 3, 2), C(2, 1, 1), C(2, 1, 2), C(2, 2, 1), C(2, 2, 2), C(2, 3, 1), C(2, 3, 2), C(3, 1, 1), C(3, 1, 2), C(3, 2, 1), C(3, 2, 2), C(3, 3, 1), and C(3, 3, 2). Consecutive arrangement of the coils of the phases in the groups in the circumferential direction in this manner leads to increase in the difference among the amplitudes of voltage waveforms in the respective phases due to unbalance, in the magnetic gap length, that is caused by static eccentricity and dynamic eccentricity. As described in detail later, increase in the difference among the amplitudes of the voltage waveforms in the respective phases leads to increase also in the difference among $N^{th}$-order harmonic components of respective line-to-line voltages to be used for estimating magnetic gap lengths, and thus the accuracy of magnetic gap length estimation can be more increased.

Figure 4:
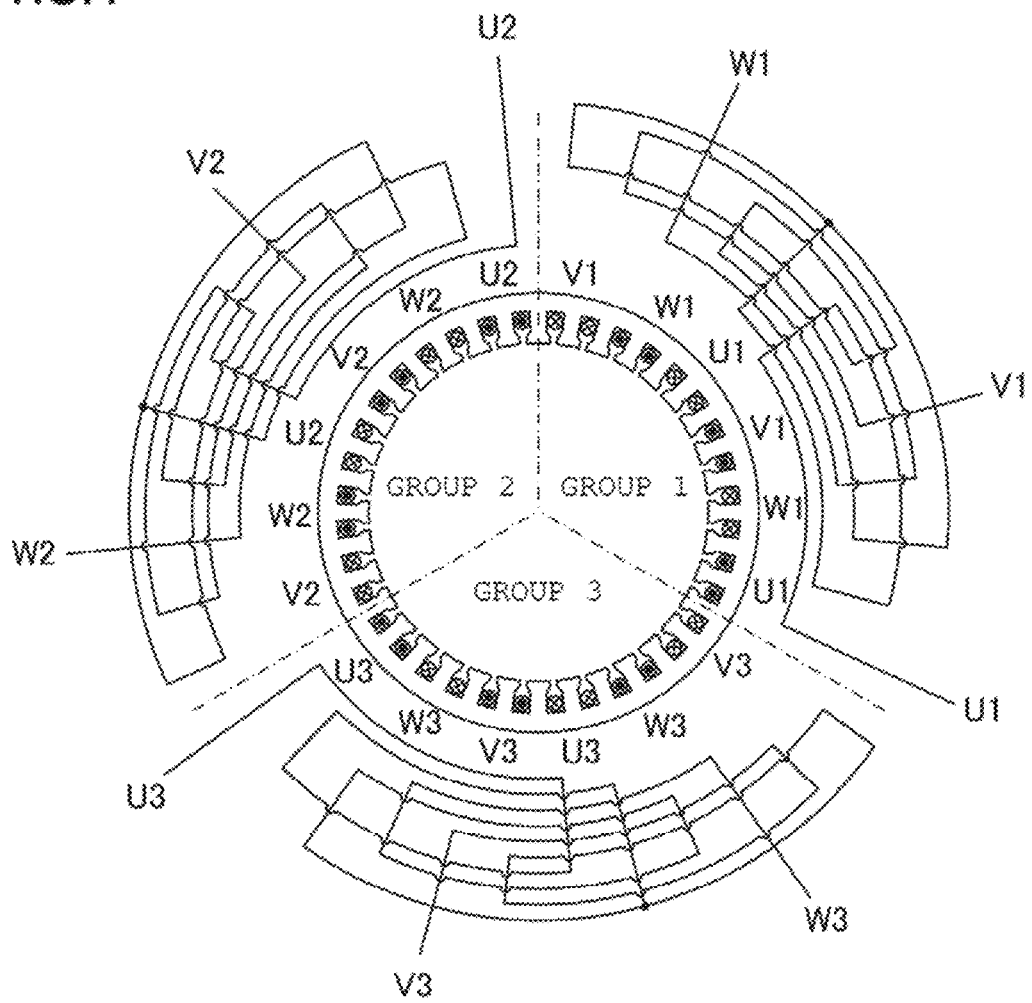
FIG. 4 is a wire connection diagram of the rotating electric machine according to embodiment 1.

FIG. 4 is a wire connection diagram of the rotating electric machine in the present embodiment. The coils in each of the groups are independently connected in Y connection, and the coils of each of the phases are connected in series. With such a circuit configuration, the difference among the amplitudes of the voltage waveforms in the respective phases increases more, and thus the accuracy of magnetic gap length estimation can be increased more for the same reason as that described above. In addition, since the coils in each of the groups are connected in Y connection, and the coils of each of the phases are connected in series, no circulation current is generated. Therefore, influence of an induced voltage based on a circulation current is not inflicted, and thus the accuracy of line-to-line voltage detection can be improved.

Figure 5:
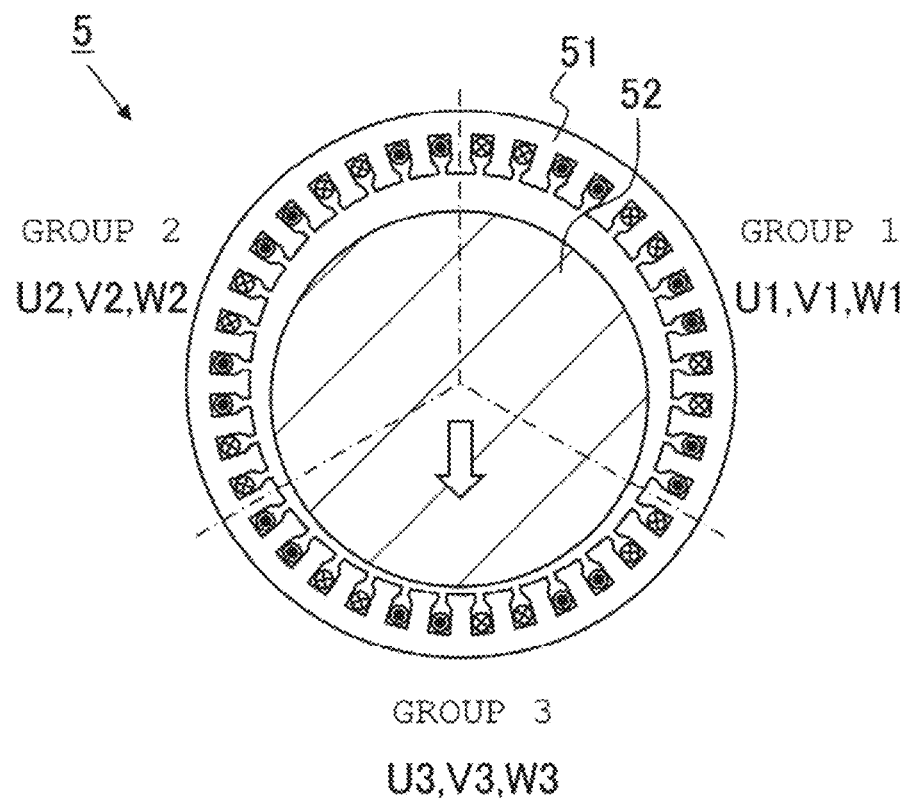
FIG. 5 is a schematic diagram of the rotating electric machine according to embodiment 1.

Next, a magnetic gap length estimating method to be performed by the magnetic gap length estimating device 1 in the present embodiment will be described. FIG. 5 is a schematic diagram showing a state where the rotating electric machine that is subjected to measurement suffers static eccentricity. It is assumed that, in this rotating electric machine 5, the central axis of a rotor 52 is deviated from the central axis of the stator 51 in a direction toward group 3. In this case, the magnetic gap between the stator 51 and the rotor 52 is uneven in the circumferential direction. A magnetic gap length estimating method for the rotating electric machine shown in FIG. 5 will be described.

Figure 6:
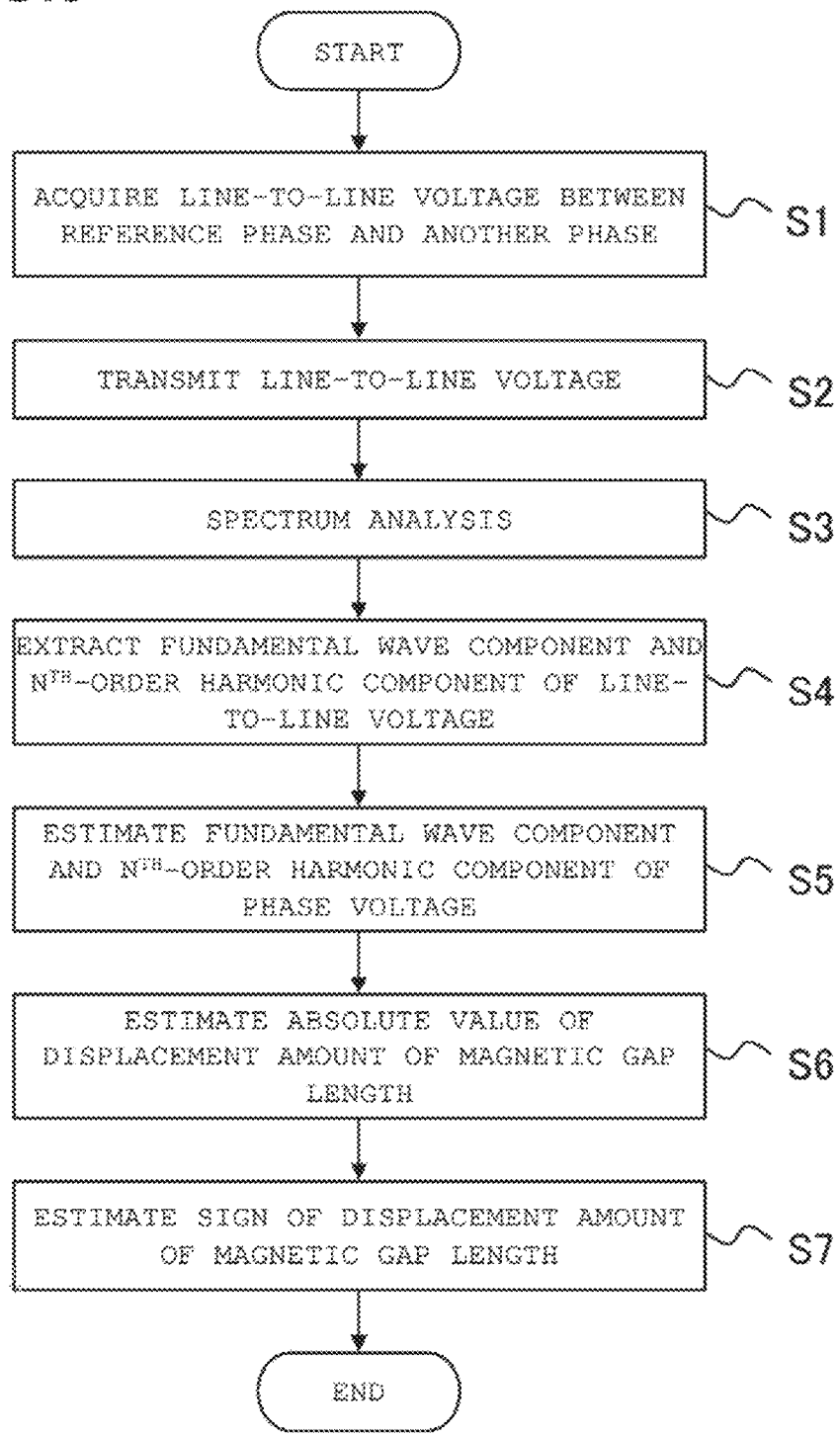
FIG. 6 is a flowchart of a magnetic gap length estimating method in embodiment 1.

FIG. 6 is a flowchart of the magnetic gap length estimating method in the present embodiment. In step S1, no-load-induced line-to-line voltages (hereinafter, written as line-to-line voltages) are acquired between a U1 phase and the other phases with the U1 phase being a reference. Specifically, the voltage acquiring unit 2 of the magnetic gap length estimating device 1 acquires line-to-line voltages between U1 and V1, between U1 and W1, between U1 and U2, between U1 and V2, between U1 and W2, between U1 and U3, between U1 and V3, and between U1 and W3. Next, in step S2, the voltage acquiring unit 2 transmits data of the acquired line-to-line voltages to the magnetic gap estimating unit 3. The magnetic gap estimating unit 3 saves the received data of the line-to-line voltages into the memory unit 31.

Next, in step S3, the spectrum analysis unit 37 of the analysis unit 34 performs spectrum analysis on the data of the line-to-line voltages saved in the memory unit 31. Specifically, the spectrum analysis unit 37 applies the algorithm of fast Fourier transform to the data of the line-to-line voltages, to convert the data into information about amplitudes and phases for respective frequencies. Next, in step S4, the frequency analysis unit 38 extracts amplitudes and phases of a fundamental wave component and an $N^{th}$-order harmonic component of each of the line-to-line voltages from the information about the amplitudes and the phases for the respective frequencies.

Here, the relationship between the magnetic gap length, and a fundamental wave component and an $N^{th}$-order harmonic component of each of a phase voltage and a line-to-line voltage, will be described. It is noted that N is 3 in the present embodiment.

Figure 7:
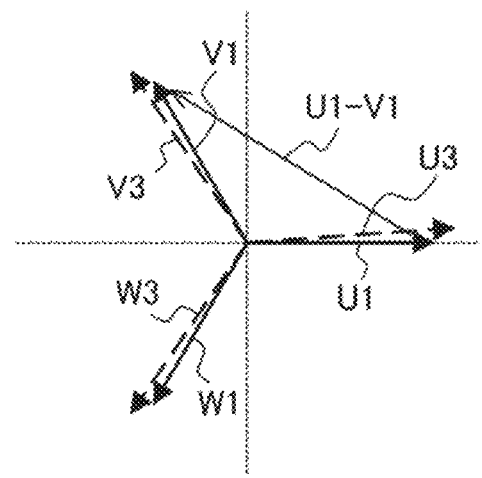
FIG. 7 is a diagram for explaining fundamental wave components of phase voltages in the rotating electric machine in embodiment 1.
Figure 8:
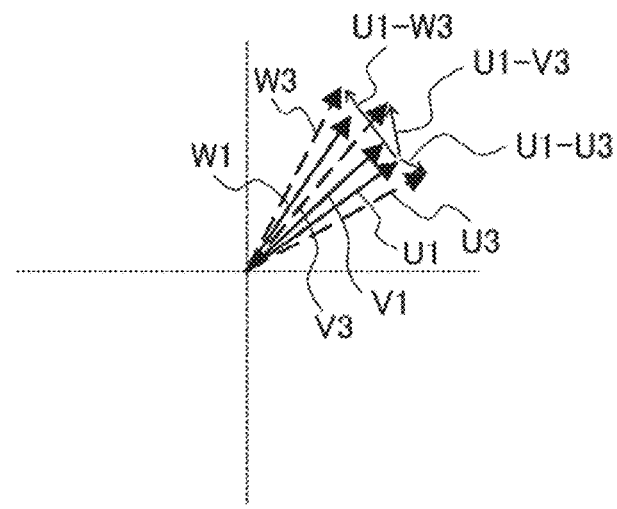
FIG. 8 is a diagram for explaining third-order harmonic components of the phase voltages in the rotating electric machine in embodiment 1.

FIG. 7 and FIG. 8 are diagrams for explaining phase voltages and line-to-line voltages in each of group 1 and group 3 of the rotating electric machine 5. FIG. 7 shows fundamental wave components with vectors, and FIG. 8 shows third-order harmonic components with vectors. In FIG. 7 and FIG. 8, solid-line arrows indicate vectors in group 1, and broken-line arrows indicate vectors in group 3. If static eccentricity has not occurred, i.e., if the magnetic gap length is even, the electrical phase difference among the fundamental wave components of the phase voltages in each of the groups is 120°, and the phases of the third-order harmonic components in each of the groups are identical to one another. However, if the magnetic gap length in group 3 is small as shown in FIG. 5, the magnetic resistance in the magnetic gap decreases so that the amount of magnetic fluxes transmitted through the coils increases, in group 3. Therefore, the phase voltages in group 3 increase as compared to a case where the magnetic gap length is even. Meanwhile, the magnetic gap length in group 1 is large, and thus the magnetic resistance in the magnetic gap increases so that the amount of magnetic fluxes transmitted through the coils decreases, in group 1. Therefore, the phase voltages in group 1 decrease as compared to the case where the magnetic gap length is even. This corresponds to the fact that, in FIG. 7 and FIG. 8, the lengths of the vectors for the U3, V3, and W3 phases in group 3 are larger than the lengths of the vectors for the U1, V1, and W1 phases in group 1, respectively.

In addition, the amount of magnetic fluxes transmitted through the coils becomes uneven owing to static eccentricity, and thus the phase of each phase voltage deviates from the phase of the phase voltage obtained when the magnetic gap length is even. Therefore, the orientation of each vector in group 1 and the orientation of the corresponding vector in group 3 differ from each other. Here, focus is placed on the third-order harmonic components shown in FIG. 8. If the magnetic gap length is even, the lengths and the orientations of the vectors of the phase voltages are the same among all the groups, and thus line-to-line voltages indicated as the differences between the vectors of the phase voltages are not generated. However, if the magnetic gap length is uneven, the lengths and the orientations of the vectors of the phase voltages differ among the groups. Therefore, as shown in FIG. 8, line-to-line voltages between U1 and U3, between U1 and V3, and between U1 and W3 are generated. That is, the third-order harmonic components of the line-to-line voltages are found to be feature quantities generated when the magnetic gap length becomes uneven.

Next, with reference back to FIG. 6, description of the flowchart of the magnetic gap length estimating method will be continued.

Figure 9:
FIG. 9 is a diagram for explaining the magnetic gap length estimating method in embodiment 1.

In step S5, the frequency analysis unit 38 uses the fundamental wave component of each of the line-to-line voltages, to estimate a fundamental wave component and a third-order harmonic component of the corresponding phase voltage. In this estimation, the deviation between the phase of each phase voltage obtained when the magnetic gap length is uneven and the phase of the phase voltage obtained when the magnetic gap length is even is assumed to be small and is ignored, and a theoretical relative relationship between the vector of the line-to-line voltage and the vector of the phase voltage is used. FIG. 9 is a diagram for explaining a method for estimating the phase of each of the fundamental wave component and the third-order harmonic component of the phase voltage in the U1 phase from the line-to-line voltage between U1 and V1 in step S5. The estimating method shown in FIG. 9 is a method in a case where a sine wave is assumed as the phase voltage waveform in the U1 phase. The phase of the fundamental wave component of the phase voltage in the U1 phase lags behind the phase of the fundamental wave component of the line-to-line voltage between U1 and V1 by 30°, and furthermore, the phase of the third-order harmonic component of the phase voltage in the U1 phase is 3 times the phase of the fundamental wave component of the phase voltage in the U1 phase. This is obvious from a theory of an AC circuit and the relationships among the vectors shown in FIG. 7 and FIG. 8. The phase of the third-order harmonic component of the phase voltage in the U1 phase can be estimated with use of these relationships. Meanwhile, if a cosine wave is assumed as the phase voltage waveform in the U1 phase, it is obvious that the phase of the third-order component of the phase voltage in the U1 phase is further shifted, by a phase difference of 180°, from the phase that is 3 times the phase of the fundamental wave component of the phase voltage in the U1 phase.

Next, the estimating-and-calculating unit 35 estimates a magnetic gap length with use of the third-order harmonic component of each line-to-line voltage and the third-order harmonic component of the corresponding phase voltage. To this end, in step S6, the estimating-and-calculating unit 35 estimates the absolute value of the displacement amount of a magnetic gap length at the center position of the group in which the coils of each of the phases are wound, relative to a magnetic gap length at the center position of the group in which the coils of the reference phase are wound. Next, in step S7, the estimating-and-calculating unit 35 estimates, on the basis of the relationship between the phase of the third-order harmonic component of each line-to-line voltage and the phase of the third-order harmonic component of the corresponding phase voltage estimated in step S5, whether the direction of displacement of the magnetic gap length at the center position of the group in which the coils of the relevant phase are wound is a positive direction or a negative direction relative to the magnetic gap length at the center position of the group in which the coils of the reference phase are wound.

Figure 10:
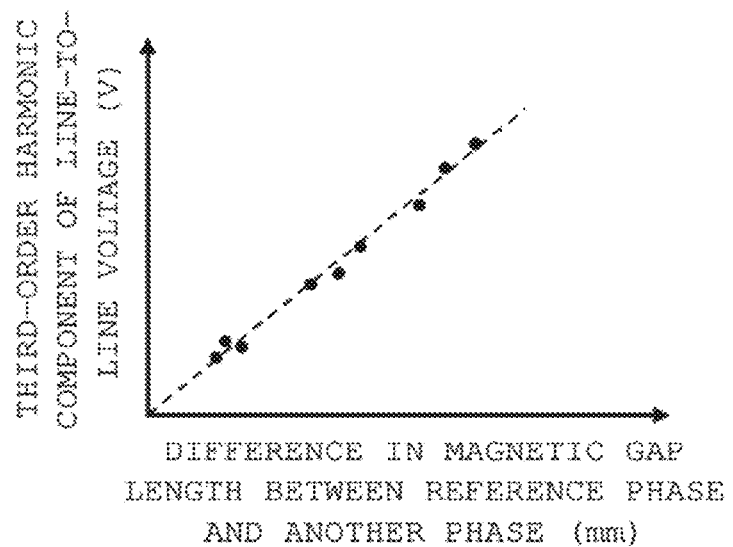
FIG. 10 is a diagram for explaining the magnetic gap length estimating method in embodiment 1.

FIG. 10 is a diagram for explaining an example of the relationship between the displacement amount of the magnetic gap length between the reference phase and another phase, and the amplitude of the third-order harmonic component of the line-to-line voltage. As explained in step S5, if the deviation between the phase of each phase voltage obtained when the magnetic gap length is uneven and the phase of the phase voltage obtained when the magnetic gap length is even is assumed to be small, there is a correlation between the displacement amount of the magnetic gap length and the amplitude of the third-order harmonic component of the line-to-line voltage. The correlation is a roughly proportional relationship. This relationship between the displacement amount of the magnetic gap length between the reference phase and each of the phases, and the amplitude of the third-order harmonic component of the corresponding line-to-line voltage, is made into a database through theoretical calculation, simulations, experiments, or the like in advance and is stored in the estimation reference storing unit 33. In step S6, the estimating-and-calculating unit 35 uses the relationship (stored in the estimation reference storing unit 33) between the displacement amount of the magnetic gap length between the reference phase and another phase, and the amplitude of the third-order harmonic component of the line-to-line voltage, to estimate the absolute value of the displacement amount of the magnetic gap length in the group in which the coils of the relevant phase are wound.

Figure 11:
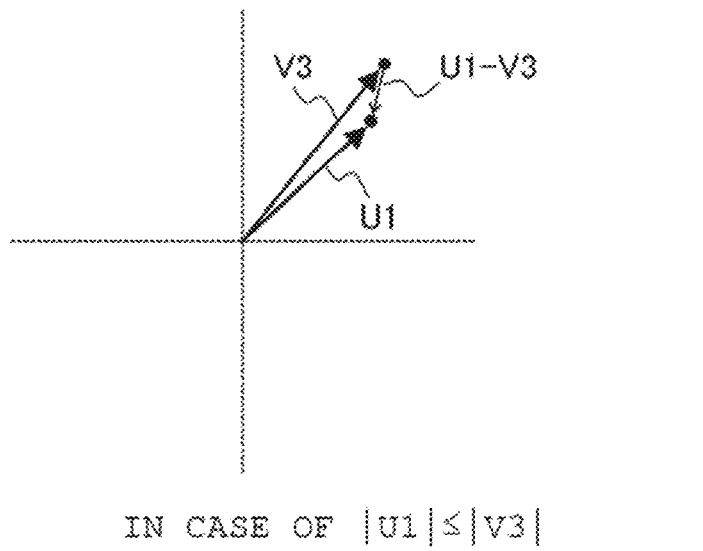
FIG. 11 is a diagram for explaining the magnetic gap length estimating method in embodiment 1.
Figure 12:
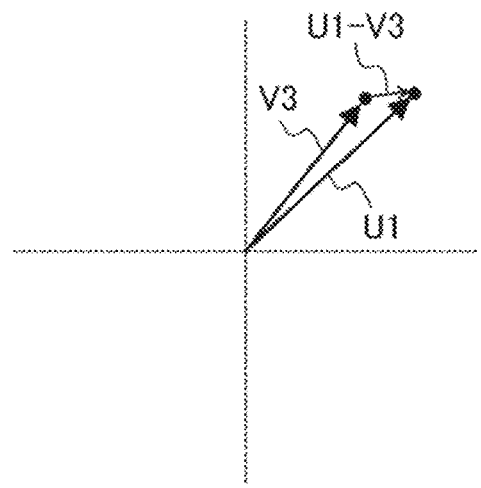
FIG. 12 is a diagram for explaining the magnetic gap length estimating method in embodiment 1.

FIG. 11 and FIG. 12 are each a diagram for explaining an example of a method for determining a reduction or enlargement direction of the magnetic gap length. FIG. 11 and FIG. 12 each show a relationship of the phase of the third-order harmonic component of each phase voltage estimated in step S5. FIG. 11 shows a case where the third-order component of the phase voltage in the V3 phase is larger than the third-order component of the phase voltage in the U1 phase. FIG. 12 shows a case where the third-order component of the phase voltage in the V3 phase is smaller than the third-order component of the phase voltage in the U1 phase. The case where the third-order component of the phase voltage in the V3 phase is larger than the third-order component of the phase voltage in the U1 phase as shown in FIG. 11 corresponds to a case where the magnetic gap length in group 3 in which the coils of the V3 phase are wound is smaller than the magnetic gap length in group 1 in which the coils of the U1 phase are wound. In this case, the orientation of the vector of the third-order component of the line-to-line voltage between U1 and V3 is within a range of not smaller than 90° and smaller than 2700 with respect to the orientation of the vector of the third-order component of the phase voltage in the U1 phase serving as a reference. Meanwhile, the case where the third-order component of the phase voltage in the V3 phase is smaller than the third-order component of the phase voltage in the U1 phase as shown in FIG. 12 corresponds to a case where the magnetic gap length in group 3 in which the coils of the V3 phase are wound is larger than the magnetic gap length in group 1 in which the coils of the U1 phase are wound. In this case, the orientation of the vector of the third-order component of the line-to-line voltage between U1 and V3 is within a range of not smaller than 0° and smaller than 90° or within a range of not smaller than 270° and smaller than 360° with respect to the orientation of the vector of the third-order component of the phase voltage in the U1 phase serving as a reference. In step S7, the estimating-and-calculating unit 35 uses these relationships to estimate whether the direction of displacement of the magnetic gap length in the group in which the coils of the relevant phase are wound is a positive direction or a negative direction relative to the magnetic gap length in the group in which the coils of the reference phase are wound. As in the present embodiment, a relationship in a case where static eccentricity has occurred in an orientation of reduction of the magnetic gap length in group 3 is the relationship shown in FIG. 8, and this relationship is the same as the relationship shown in FIG. 11. Therefore, it can be determined that the magnetic gap length in group 3 in which the coils of the V3 phase are wound has become smaller than the magnetic gap length in group 1 in which the coils of the U1 phase are wound.

Figure 13:
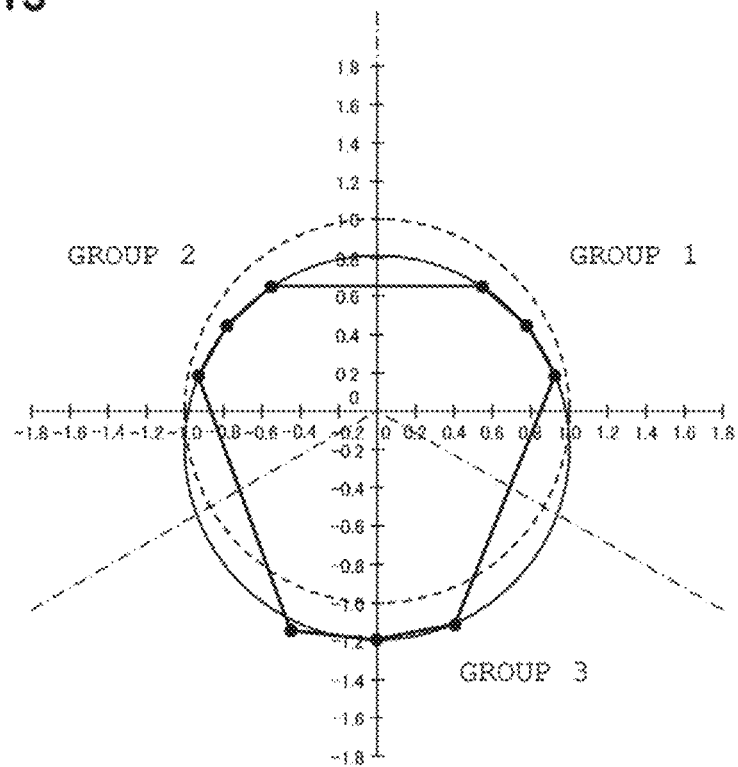
FIG. 13 shows a result of estimation by the magnetic gap length estimating device in embodiment 1.

In this manner, the magnetic gap length estimating device 1 in the present embodiment can estimate the magnetic gap length in the rotating electric machine that is subjected to measurement. FIG. 13 shows a result of the magnetic gap length estimation performed on the rotating electric machine shown in FIG. 5 by the magnetic gap length estimating device 1 in the present embodiment. In FIG. 13, a broken circular line indicates a magnetic gap length obtained in a case of no occurrence of eccentricity, a solid circular line indicates a theoretically calculated value, of the magnetic gap, that is obtained in a case of occurrence of eccentricity and that is based on analysis data obtained in advance, and black circles indicate estimated values of the magnetic gap length in the present embodiment. In the present embodiment, magnetic gap length estimation is performed on the three-group three-phase rotating electric machine, and thus magnetic gap lengths at nine (3×3=9) points can be estimated. It is noted that, in FIG. 13, the angles formed by line segments connecting the origin and the respective estimation points to each other are set to be equal to the angles formed by line segments connecting the center in the actual structure of the rotating electric machine and the respective center positions of the groups to each other such that the relationship in spatial arrangement among the nine estimation points of the magnetic gap length corresponds to the actual structure of the rotating electric machine, in order to make it easy to visually understand a spatial distribution of the magnetic gap lengths. The distance from the origin to each of the estimation points has a relative value obtained by adding or subtracting the displacement amount of the estimation point in a case where a magnetic gap length at a winding position in the reference phase is defined as 1.

As shown in FIG. 13, the magnetic gap length estimating device 1 in the present embodiment can estimate, relative to a magnetic gap length at the center position of group 1 in which winding for the U1 phase as a reference phase is performed, a magnetic gap length in each of the phases at the center position of another group as a relative value. In addition, it is found that the theoretically calculated value indicated by the solid circular line is approximately equal to the estimated values of the magnetic gap length obtained by the magnetic gap length estimating device 1 in the present embodiment. However, errors are generated between the theoretically calculated value and the estimated values. The errors are considered to have been caused by assuming that, in step S6, the deviation between the phase of each phase voltage obtained when the magnetic gap length is uneven and the phase of the phase voltage obtained when the magnetic gap length is even is small. The magnetic gap length estimating device in the present embodiment can distinctly estimate the position at which eccentricity has occurred and the direction of the eccentricity, even though there are errors to some extent.

As described above, the magnetic gap length estimating device in the present embodiment includes: a voltage acquiring unit which acquires a line-to-line voltage induced under no load; and a magnetic gap estimating unit which estimates a magnetic gap length in the rotating electric machine. The magnetic gap estimating unit includes: a spectrum analysis unit which converts the line-to-line voltage into amplitudes and phases for respective frequencies; a frequency analysis unit which extracts amplitudes and phases of a fundamental wave component and an $N^{th}$-order harmonic component of the line-to-line voltage from among the amplitudes and the phases for the respective frequencies; and an estimating-and-calculating unit which estimates the magnetic gap length in the rotating electric machine from the amplitudes and the phases of the fundamental wave component and the $N^{th}$-order harmonic component of the line-to-line voltage. Therefore, in the magnetic gap length estimating device in the present embodiment, neither a current sensor nor a current load is necessary, and a voltage at a connection-wire neutral point does not need to be measured.

Although an example in which the U1 phase is set as a reference phase has been described in the present embodiment, the same advantageous effect can be obtained also if any of the other phases is set as a reference phase. In addition, an example of static eccentricity in which the magnetic gap length is reduced in the direction toward group 3 has been described in the present embodiment. In the magnetic gap length estimating device in the present embodiment, the same advantageous effect can be obtained also if static eccentricity occurs in another direction. In addition, in the magnetic gap length estimating device, the same advantageous effect can be obtained by estimating a magnetic gap length per unit time in consideration of the fact that the direction of reduction or enlargement of the magnetic gap length changes over time, also at the time of dynamic eccentricity. Further, even in a case where unbalance in the magnetic gap length occurs owing to a factor other than static eccentricity and dynamic eccentricity, if there is a difference in the no-load-induced line-to-line voltage between a reference phase and another phase, the same advantageous effect can be obtained by using the magnetic gap length estimating device in the present embodiment.

In the present embodiment, the voltage acquiring unit of the magnetic gap length estimating device is connected to all the nine connection wires of three-group three-phase windings. If the voltage acquiring unit is connected to at least two of the three connection wires in each of the groups, the magnetic gap length estimating device in the present embodiment can estimate magnetic gap lengths although the number of measurement points decreases.

Figure 14:
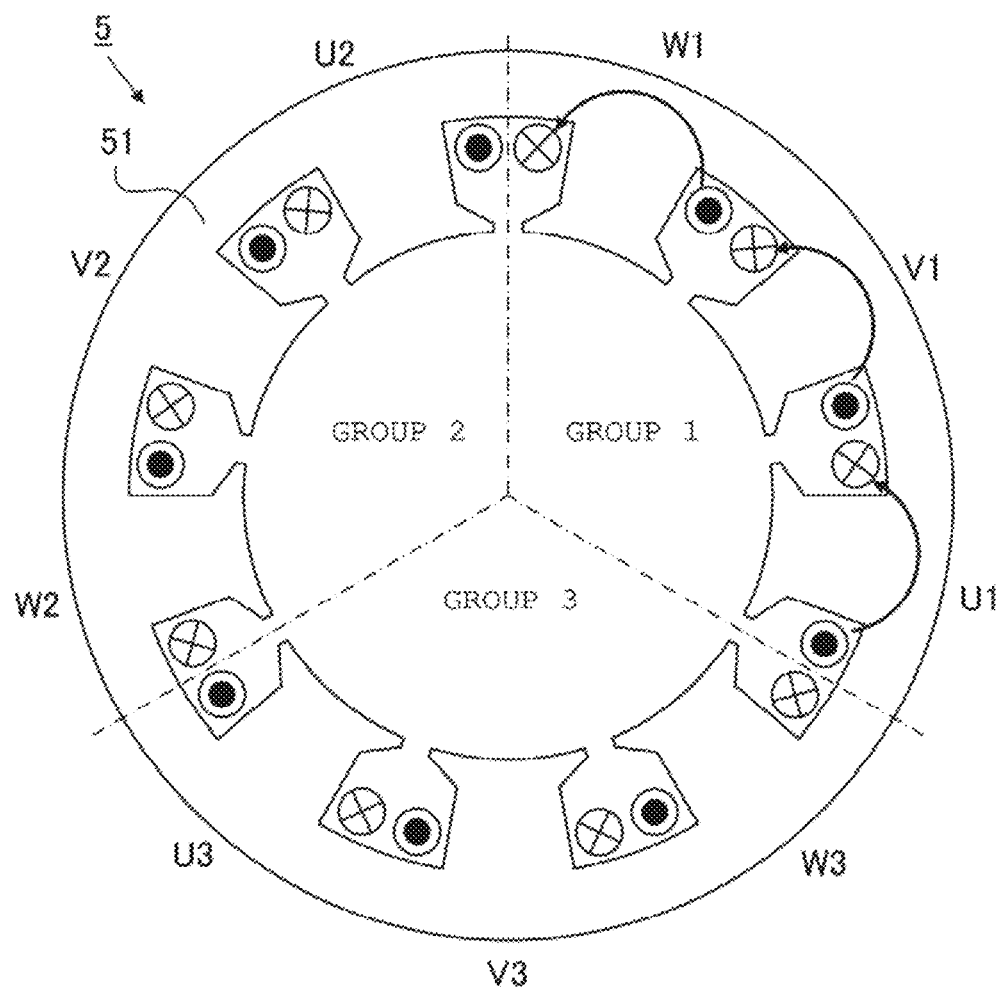
FIG. 14 is a configuration diagram of a rotating electric machine according to embodiment 1.

FIG. 14 is a configuration diagram of another rotating electric machine that is subjected to measurement by the magnetic gap length estimating device in the present embodiment. It is noted that no rotor is shown in FIG. 14. In FIG. 14, the directions of currents flowing through the respective coils are indicated by the two types of symbols. A stator 51 shown in FIG. 14 has a six-pole nine-slot configuration in which a coil is wound on one tooth in a concentrated winding method. If a $k^{th}$ coil of an $n^{th}$ phase in an $m^{th}$ group is written as C(m, n, k), the rotating electric machine 5 satisfies 1≤m≤M, 1≤n≤N, and 1≤k≤K and satisfies M=3, N=3, and K=1. The coils of this rotating electric machine 5 are arranged, from group 1, anticlockwise in the order of C(1, 1, 1), C(1, 2, 1), C(1, 3, 1), C(2, 1, 1), C(2, 2, 1), C(2, 3, 1), C(3, 1, 1), C(3, 2, 1), and C(3, 3, 1). In such a rotating electric machine employing a concentrated winding method as well, consecutive arrangement of the coils of the phases in the groups in the circumferential direction leads to increase in the difference among the amplitudes of voltage waveforms in the respective phases due to unbalance, in the magnetic gap length, that is caused by eccentricity. Therefore, the difference among third-order harmonic components of respective line-to-line voltages also increases, and thus the accuracy of magnetic gap length estimation can be increased more.

It is noted that the line-to-line voltages between a reference phase and the other phases are measured in the magnetic gap length estimating device in the present embodiment. The line-to-line voltages also include a line-to-line voltage between two phases belonging to respective different groups. The coils in each of the groups are independently connected in Y connection. Therefore, there is a possibility that an offset component of a potential difference due to the fact that the coils in the respective groups are electrically independent of one another is included in the line-to-line voltage between the two phases belonging to the respective different groups. In order to eliminate the offset component, neutral points of the coils connected in Y connection in the respective groups may be electrically connected to each other.

Embodiment 2

Figure 15:
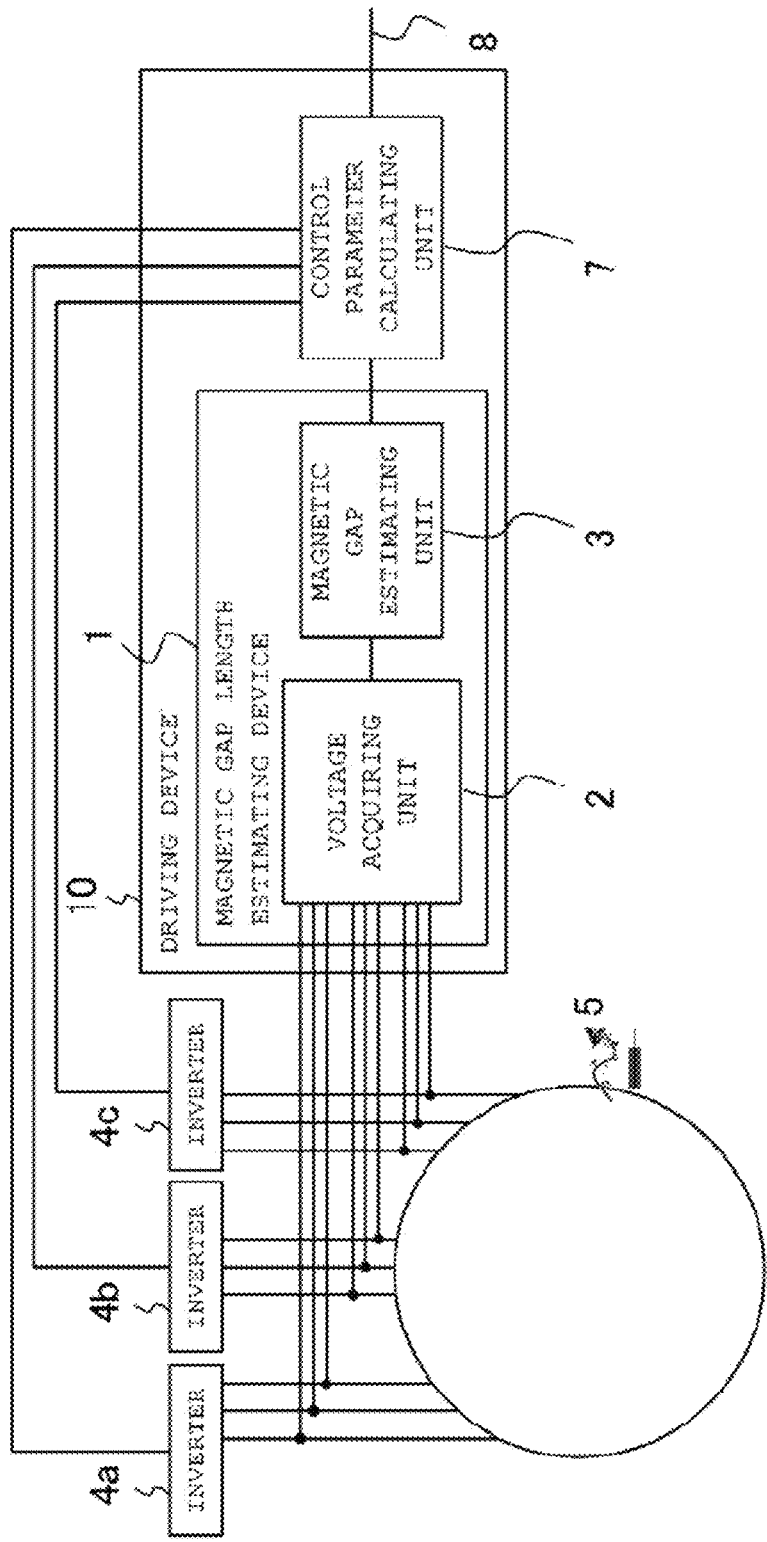
FIG. 15 is a configuration diagram of a driving device for the rotating electric machine according to embodiment 2.

FIG. 15 is a configuration diagram of a driving device for the rotating electric machine according to embodiment 2. A driving device 10 for the rotating electric machine in the present embodiment has: the magnetic gap length estimating device 1 in embodiment 1; and a control parameter calculating unit 7 which sends control parameters to the three inverters 4a, 4b, and 4c. The control parameter calculating unit 7 sends, on the basis of the magnetic gap lengths estimated by the magnetic gap length estimating device 1, control parameters for adjusting current input values for the respective groups of the rotating electric machine 5 to the three respective inverters 4a, 4b, and 4c. In addition, the control parameter calculating unit 7 has an external output terminal 8. If, for example, an external monitor is connected to the external output terminal 8, the state of the magnetic gap and the control parameters can be visualized.

For example, as explained in embodiment 1, if the rotating electric machine 5 suffers static eccentricity in a direction of reduction of the magnetic gap length in group 3, a current input value for each of the coils belonging to group 3 is set to be smaller than a current input value for each of the coils belonging to group 1 and group 2. By thus performing control, vibration and noise due to the eccentricity can be reduced.

It is noted that the voltage acquiring unit of the magnetic gap length estimating device is connected to all the nine connection wires of the three-group three-phase windings in the present embodiment. If the voltage acquiring unit is connected to at least one of the three connection wires in each of the groups, the driving device for the rotating electric machine in the present embodiment can calculate control parameters by estimating a direction of displacement of the magnetic gap length although the number of measurement points decreases.

Embodiment 3

Figure 16:
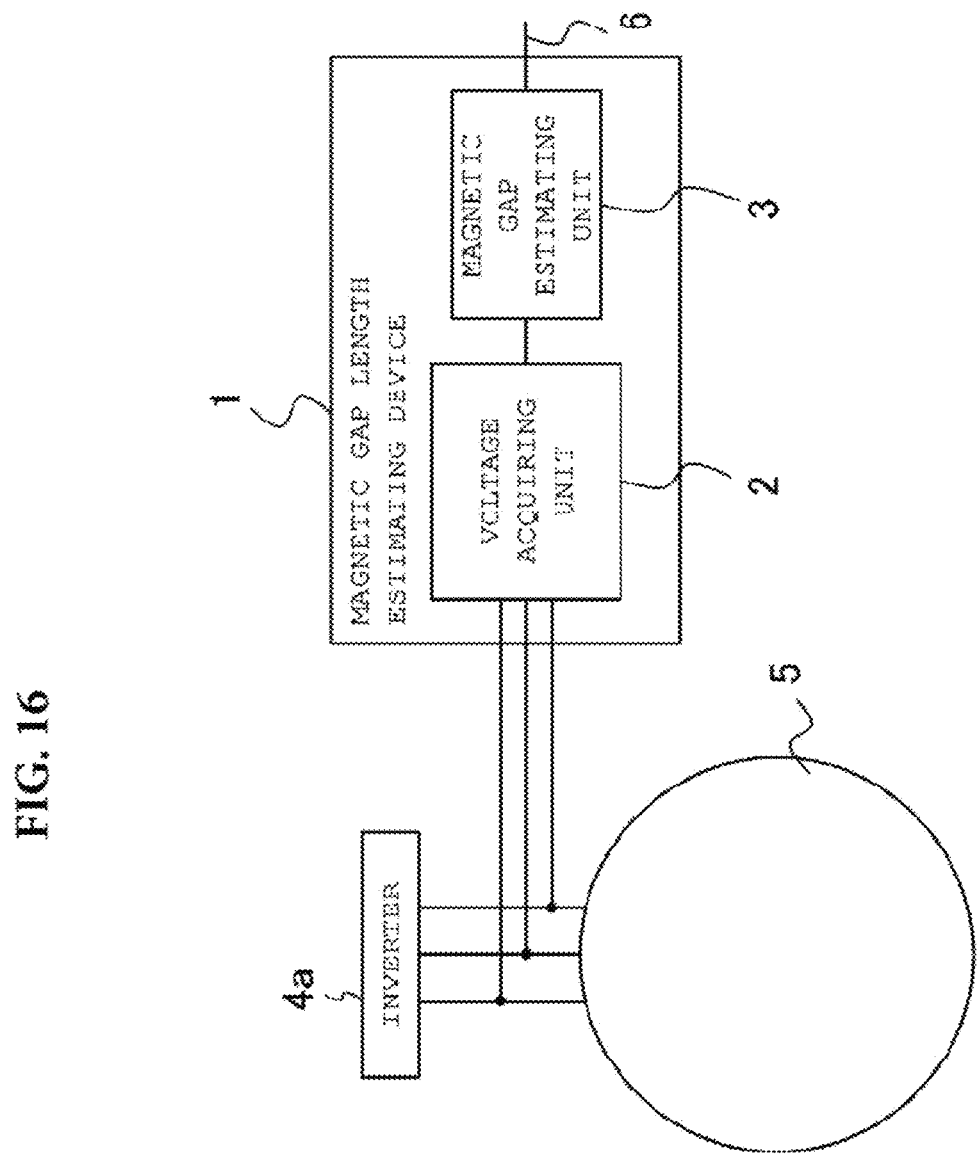
FIG. 16 is a configuration diagram of a magnetic gap length estimating device according to embodiment 3.

FIG. 16 is a configuration diagram of a magnetic gap length estimating device according to embodiment 3. The magnetic gap length estimating device according to the present embodiment is a magnetic gap length estimating device designed to perform measurement on a one-group three-phase rotating electric machine to be driven by an inverter. A magnetic gap length estimating device 1 in the present embodiment has the voltage acquiring unit 2 and the magnetic gap estimating unit 3. The configuration of the magnetic gap length estimating device 1 in the present embodiment is the same as the configuration of the magnetic gap length estimating device in embodiment 1. However, the voltage acquiring unit 2 acquires voltages of three connection wires between one inverter 4a and a rotating electric machine 5. A magnetic gap length estimating method to be performed by the magnetic gap length estimating device 1 in the present embodiment is the same as the estimating method in embodiment 1.

Figure 17:
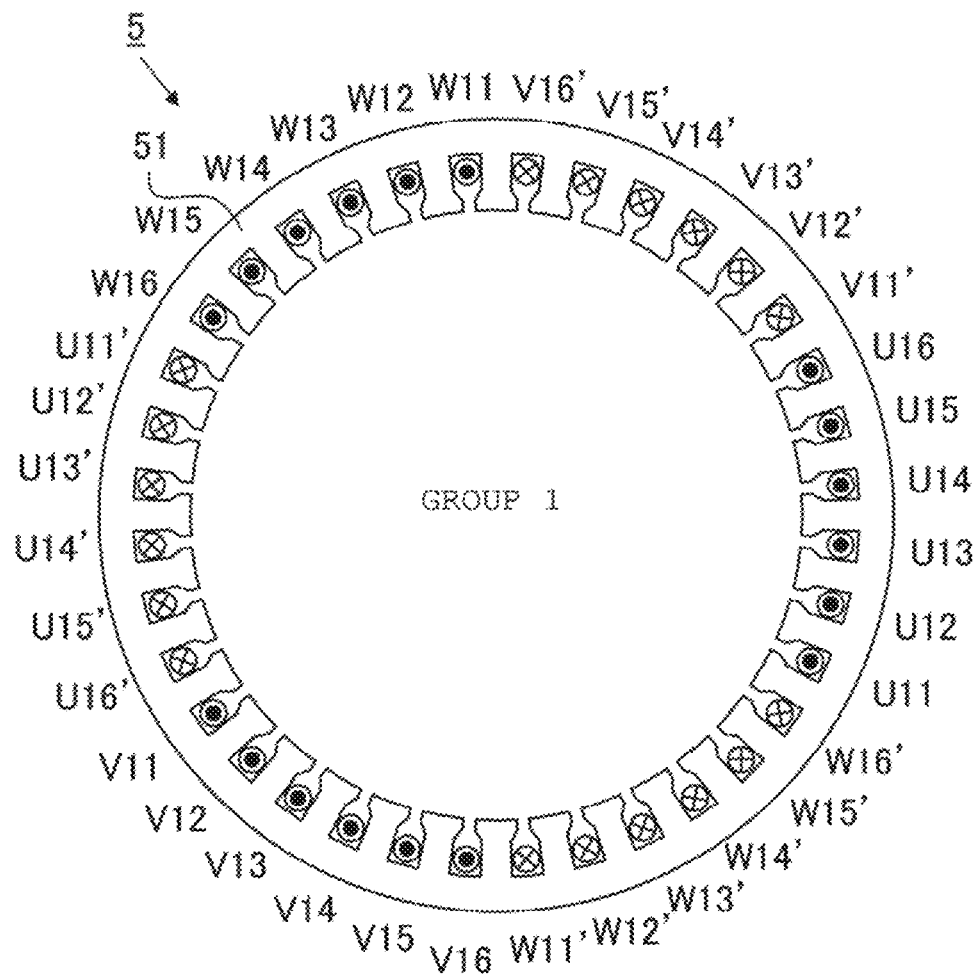
FIG. 17 is a configuration diagram of a rotating electric machine according to embodiment 3.

FIG. 17 is a configuration diagram of the rotating electric machine 5 that is subjected to measurement, in the present embodiment. The rotating electric machine 5 shown in FIG. 17 is a one-group three-phase rotating electric machine having a two-pole thirty-six-slot configuration assumed to be driven by the inverter. It is noted that no rotor is shown in FIG. 17. A stator 51 has a configuration including only group 1. In FIG. 17, the directions of currents flowing through the respective coils are indicated by the two types of symbols. The stator 51 of this rotating electric machine 5 has a distributed-winding structure in which coils are arranged over a plurality of slots. Group 1 is formed by three phases, i.e., the U, V, and W phases, and each of the phases is formed by six coils. For example, U1 indicating coils of the U phase has six coils U11, U12, U13, U14, U15, and U16. The coils are wound so as to be consecutive in the circumferential direction in the order of the coils of the U, V, and W phases. The coils of this rotating electric machine 5 are arranged anticlockwise in the order of U11, U12, U13, U14, U15, U16, V11, V12, V13, V14, V15, V16, W11, W12, W13, W14, W15, and W16.

That is, if a $k^{th}$ coil of an $n^{th}$ phase in an $m^{th}$ group in an M-group N-phase rotating electric machine in which each of the phases is formed by K coils is written as C(m, n, k), the rotating electric machine 5 shown in FIG. 17 satisfies $1 \leq m \leq M$, $1 \leq n \leq N$, and $1 \leq k \leq K$ and satisfies M=1, N=3, and K=6. The coils of this rotating electric machine 5 are arranged anticlockwise in the order of C(1, 1, 1), C(1, 1, 2), C(1, 1, 3), C(1, 1, 4), C(1, 1, 5), C(1, 1, 6), C(1, 2, 1), C(1, 2, 2), C(1, 2, 3), C(1, 2, 4), C(1, 2, 5), C(1, 2, 6), C(1, 3, 1), C(1, 3, 2), C(1, 3, 3), C(1, 3, 4), C(1, 3, 5), and C(1, 3, 6). Consecutive arrangement of the coils of the phases in the groups in the circumferential direction in this manner leads to increase in the difference among the amplitudes of voltage waveforms in the respective phases due to unbalance in the magnetic gap length. Increase in the difference among the amplitudes of the voltage waveforms in the respective phases leads to increase also in the difference among the third-order harmonic components of the respective line-to-line voltages to be used for estimating magnetic gap lengths, and thus the accuracy of magnetic gap length estimation can be increased more.

Figure 18:
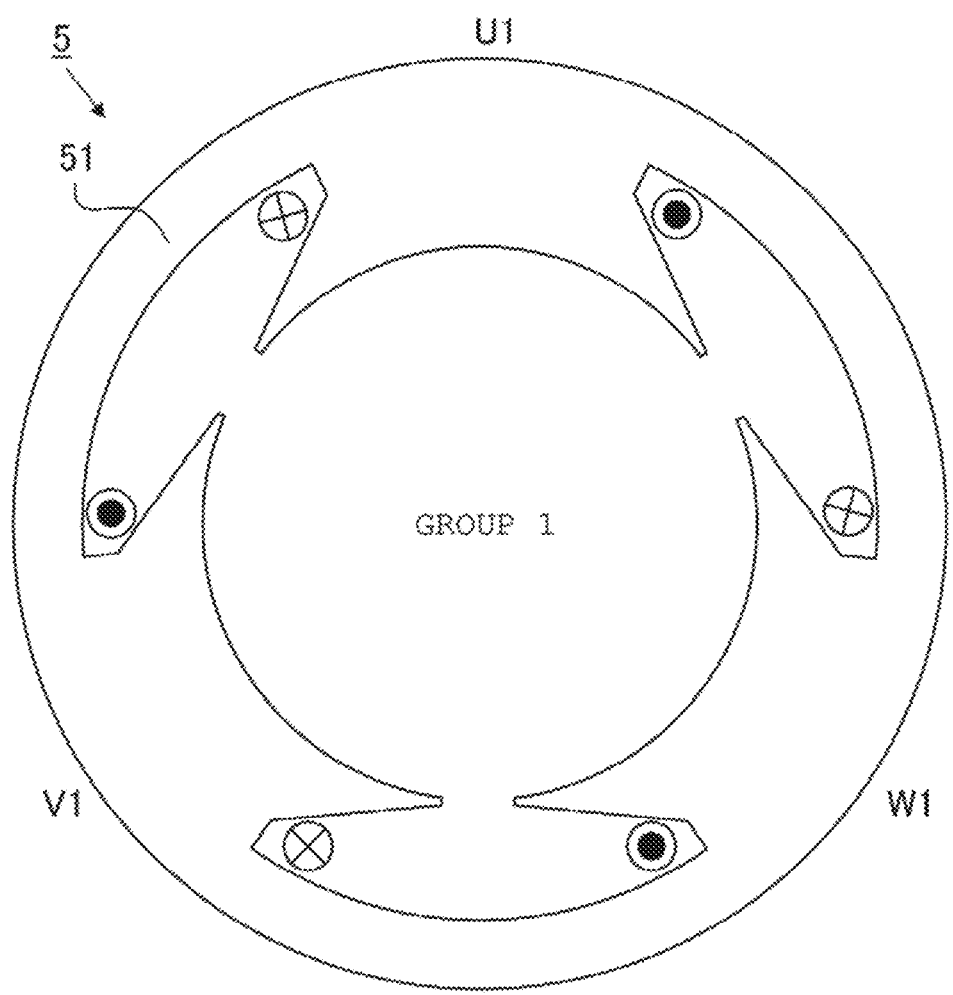
FIG. 18 is a configuration diagram of a rotating electric machine according to embodiment 3.

FIG. 18 is a configuration diagram of another rotating electric machine 5 that is subjected to measurement, in the present embodiment. The rotating electric machine 5 shown in FIG. 18 is a one-group three-phase rotating electric machine having a two-pole three-slot configuration assumed to be driven by the inverter. It is noted that no rotor is shown in FIG. 18. A stator 51 has a configuration including only group 1. In FIG. 18, the directions of currents flowing through the respective coils are indicated by the two types of symbols. The stator 51 of this rotating electric machine 5 has a structure in which a coil of each of the phases is wound on one tooth in a concentrated winding method. Group 1 is formed by three phases, i.e., the U, V, and W phases.

If a $k^{th}$ coil of an $n^{th}$ phase in an $m^{th}$ group in an M-group N-phase rotating electric machine in which each of the phases is formed by K coils is written as C(m, n, k), the rotating electric machine 5 shown in FIG. 18 satisfies $1 \leq m \leq M$, $1 \leq n \leq N$, and $1 \leq k \leq K$ and satisfies M=1, N=3, and K=1. The coils of this rotating electric machine 5 are arranged anticlockwise in the order of C(1, 1, 1), C(1, 2, 1), and C(1, 3, 1). In such a rotating electric machine employing a concentrated winding method as well, consecutive arrangement of the coils of the three phases in the circumferential direction in this manner leads to increase in the difference among the amplitudes of voltage waveforms in the respective phases due to unbalance in the magnetic gap length. Thus, the accuracy of magnetic gap length estimation can be increased more.

Figure 19:
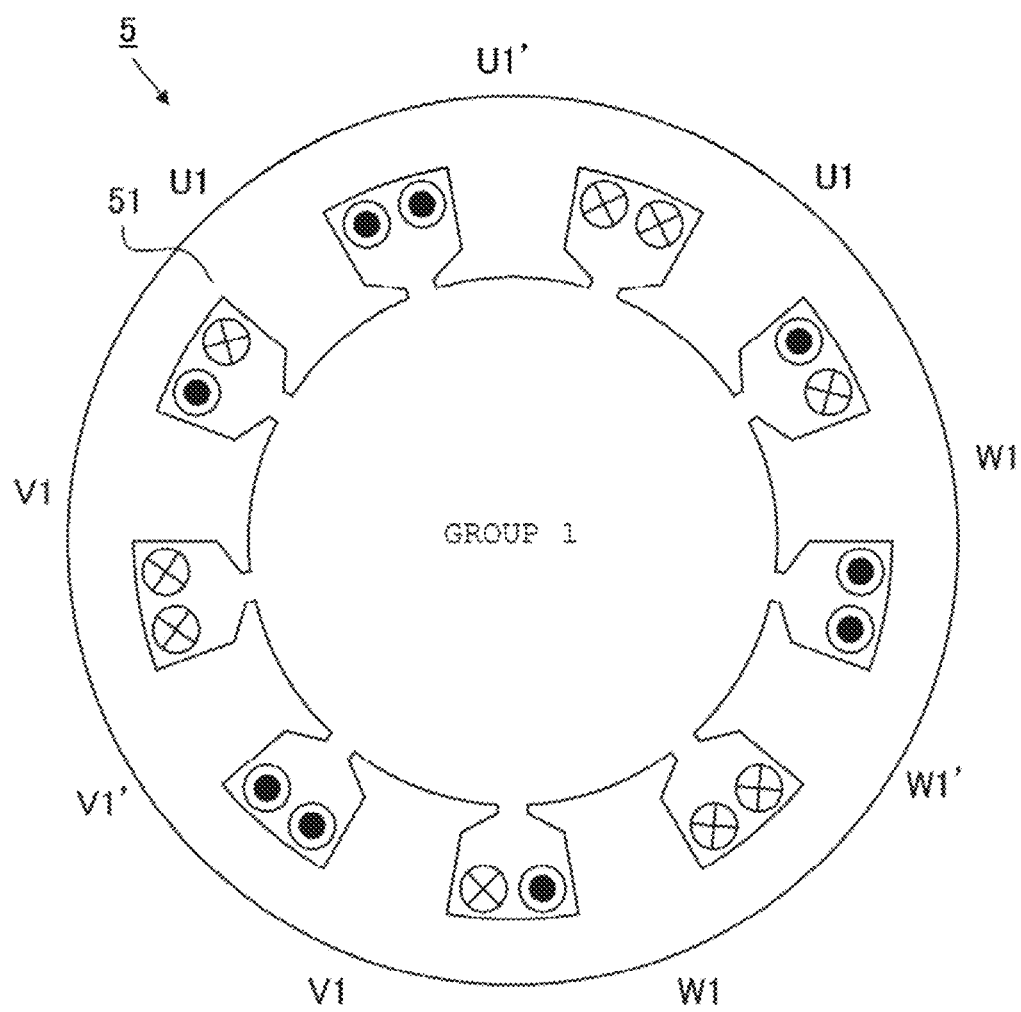
FIG. 19 is a configuration diagram of a rotating electric machine according to embodiment 3.

FIG. 19 is a configuration diagram of another rotating electric machine 5 that is subjected to measurement, in the present embodiment. The rotating electric machine 5 shown in FIG. 19 is a one-group three-phase rotating electric machine having an eight-pole nine-slot configuration assumed to be driven by the inverter. It is noted that no rotor is shown in FIG. 19. A stator 51 has a configuration including only group 1. In FIG. 19, the directions of currents flowing through the respective coils are indicated by the two types of symbols. The stator 51 of this rotating electric machine 5 has a structure in which a coil of each of the phases is wound on one tooth in a concentrated winding method. Group 1 is formed by three phases, i.e., the U, V, and W phases.

If a $k^{th}$ coil of an $n^{th}$ phase in an $m^{th}$ group in an M-group N-phase rotating electric machine in which each of the phases is formed by K coils is written as C(m, n, k), the rotating electric machine 5 shown in FIG. 19 satisfies $1 \leq m \leq M$, $1 \leq n \leq N$, and $1 \leq k \leq K$ and satisfies M=1, N=3, and K=3. The coils of this rotating electric machine 5 are arranged anticlockwise in the order of C(1, 1, 1), C(1, 1, 2), C(1, 1, 3), C(1, 2, 1), C(1, 2, 2), C(1, 2, 3), C(1, 3, 1), C(1, 3, 2), and C(1, 3, 3). In such a rotating electric machine employing a concentrated winding method as well, consecutive arrangement of the coils of the three phases in the circumferential direction in this manner leads to increase in the difference among the amplitudes of voltage waveforms in the respective phases due to unbalance in the magnetic gap length. Thus, the accuracy of magnetic gap length estimation can be increased more.

Similar to embodiment 1, neither a current sensor nor a current load is necessary, and a voltage at a connection-wire neutral point does not need to be measured, also in the magnetic gap length estimating device that is thus configured.

It is noted that the voltage acquiring unit of the magnetic gap length estimating device is connected to all the three connection wires of one-group three-phase windings in the present embodiment. If the voltage acquiring unit is connected to at least two of the three connection wires, the magnetic gap length estimating device in the present embodiment can estimate magnetic gap lengths although the number of measurement points decreases.

It is noted that, if the driving device for the rotating electric machine described in embodiment 2 is formed with use of the magnetic gap length estimating device in the present embodiment, and the driving device is applied to the rotating electric machine having the eight-pole nine-slot configuration shown in FIG. 19, vibration and noise can be further reduced also in the rotating electric machine formed by combination of the pole and slot numbers with a low winding factor of a spatial harmonic order component.

Embodiment 4

Figure 20:
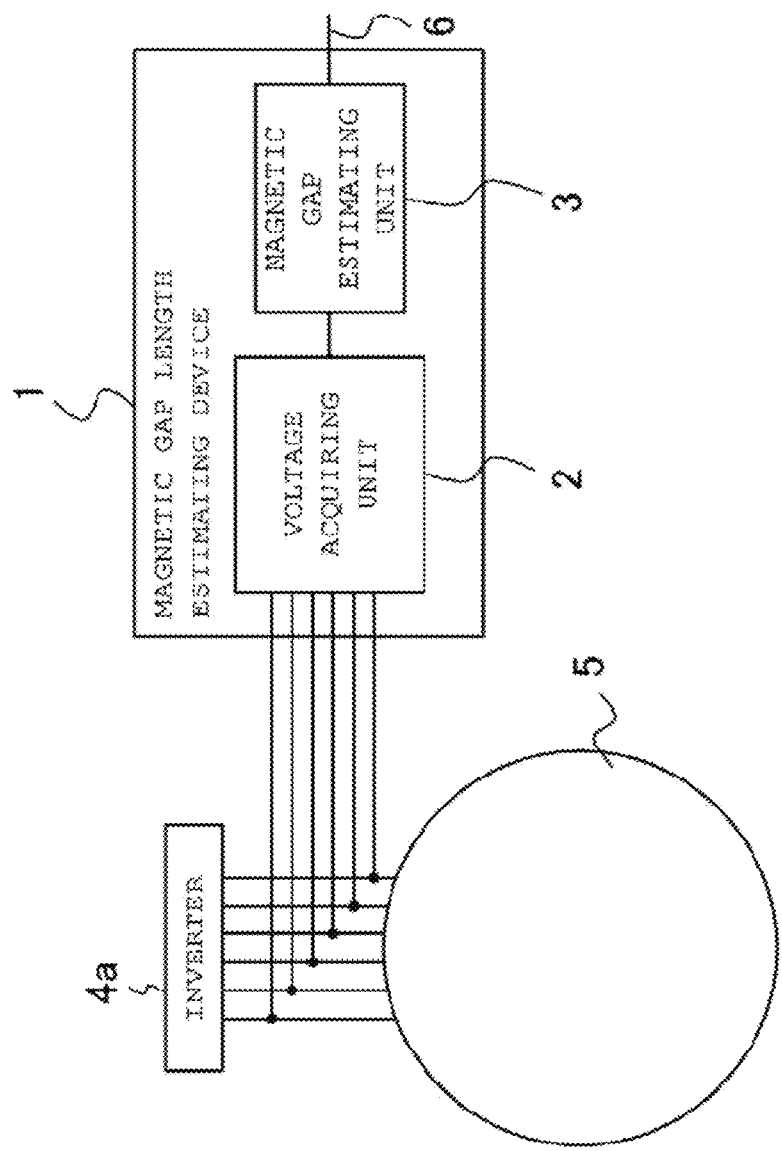
FIG. 20 is a configuration diagram of a magnetic gap length estimating device according to embodiment 4.

FIG. 20 is a configuration diagram of a magnetic gap length estimating device according to embodiment 4. The magnetic gap length estimating device according to the present embodiment is a magnetic gap length estimating device designed to perform measurement on a one-group six-phase rotating electric machine to be driven by the inverter. A magnetic gap length estimating device 1 in the present embodiment has the voltage acquiring unit 2 and the magnetic gap estimating unit 3. The configuration of the magnetic gap length estimating device 1 in the present embodiment is the same as the configuration of the magnetic gap length estimating device in embodiment 1. However, the voltage acquiring unit 2 acquires voltages of six connection wires between the one inverter 4a and the rotating electric machine 5. In addition, a magnetic gap length estimating method to be performed by the magnetic gap length estimating device 1 in the present embodiment partially differs from the estimating method in embodiment 1.

Figure 21:
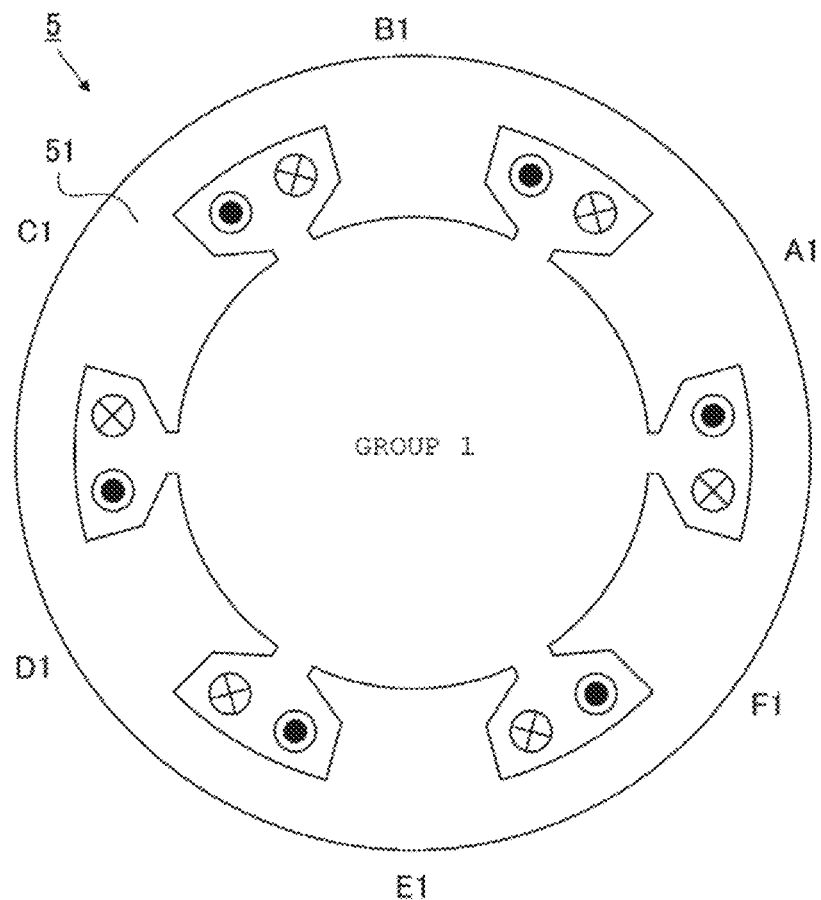
FIG. 21 is a configuration diagram of a rotating electric machine according to embodiment 4.

FIG. 21 is a configuration diagram of the rotating electric machine 5 that is subjected to measurement, in the present embodiment. The rotating electric machine 5 shown in FIG. 21 is a one-group six-phase rotating electric machine having a two-pole six-slot configuration assumed to be driven by the inverter. It is noted that no rotor is shown in FIG. 21. A stator 51 has a configuration including only group 1. In FIG. 21, the directions of currents flowing through the respective coils are indicated by the two types of symbols. The stator 51 of the rotating electric machine 5 in the present embodiment has a structure in which a coil of each of the phases is wound on one tooth in a concentrated winding method. Group 1 is formed by six phases, i.e., A, B, C, D, E, and F phases, and the coils are arranged anticlockwise in the order of A1, B1, C1, D1, E1, and F1.

That is, if a $k^{th}$ coil of an $n^{th}$ phase in an $n^{th}$ group in an M-group N-phase rotating electric machine in which each of the phases is formed by K coils is written as C(m, n, k), the rotating electric machine 5 in the present embodiment satisfies $1 \leq m \leq M$, $1 \leq n \leq N$, and $1 \leq k \leq K$ and satisfies M=1, N=6, and K=1. The coils of this rotating electric machine 5 are arranged anticlockwise in the order of C(1, 1, 1), C(1, 2, 1), C(1, 3, 1), C(1, 4, 1), C(1, 5, 1), and C(1, 6, 1). Consecutive arrangement of the coils of the phases in the groups in the circumferential direction in this manner leads to increase in the difference among the amplitudes of voltage waveforms in the respective phases due to unbalance in the magnetic gap length. Increase in the difference among the amplitudes of the voltage waveforms in the respective phases leads to increase also in the difference among the $N^{th}$-order harmonic components of the respective line-to-line voltages to be used for estimating magnetic gap lengths, and thus the accuracy of magnetic gap length estimation can be increased more.

Figure 22:
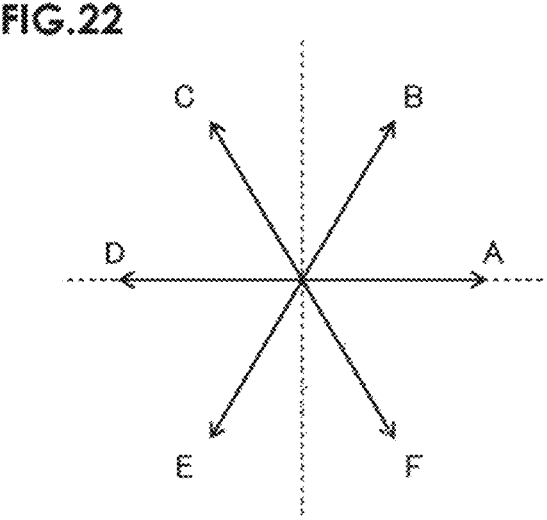
FIG. 22 is a diagram for explaining fundamental wave components of phase voltages in the rotating electric machine in embodiment 4.

FIG. 22 shows, with vectors, fundamental wave components of phase voltages in the rotating electric machine 5 in the present embodiment. The fundamental wave components of the phase voltages shown in FIG. 22 indicate vectors with no eccentricity having occurred. The electrical phase difference among the phases is 360/6=60°, and it is found that, if the relationships in FIG. 7 and FIG. 8 for embodiment 1 are applied, the phases of sixth-order harmonic components of the phase voltages are identical to one another so that the vectors of the sixth-order harmonic components overlap with one another when no eccentricity has occurred. That is, in the rotating electric machine in the present embodiment, sixth-order harmonic components of line-to-line voltages are found to be feature quantities generated when the magnetic gap length becomes uneven. Thus, a magnetic gap length estimating method in the present embodiment differs from the magnetic gap length estimating method in embodiment 1 in that sixth-order harmonic components of line-to-line voltages are used. That is, in the magnetic gap length estimating device in the present embodiment, sixth-order harmonic components are used as the $N^{th}$-order harmonic components in step S4 and step S5 of the flowchart in FIG. 6 for embodiment 1. The other features are the same as those in embodiment 1.

Similar to embodiment 1, neither a current sensor nor a current load is necessary, and a voltage at a connection-wire neutral point does not need to be measured, also in the magnetic gap length estimating device that is thus configured.

It is noted that the voltage acquiring unit of the magnetic gap length estimating device is connected to all the six connection wires of one-group six-phase windings in the present embodiment. If the voltage acquiring unit is connected to at least two of the six connection wires, the magnetic gap length estimating device in the present embodiment can estimate magnetic gap lengths although the number of measurement points decreases.

Embodiment 5

Figure 23:
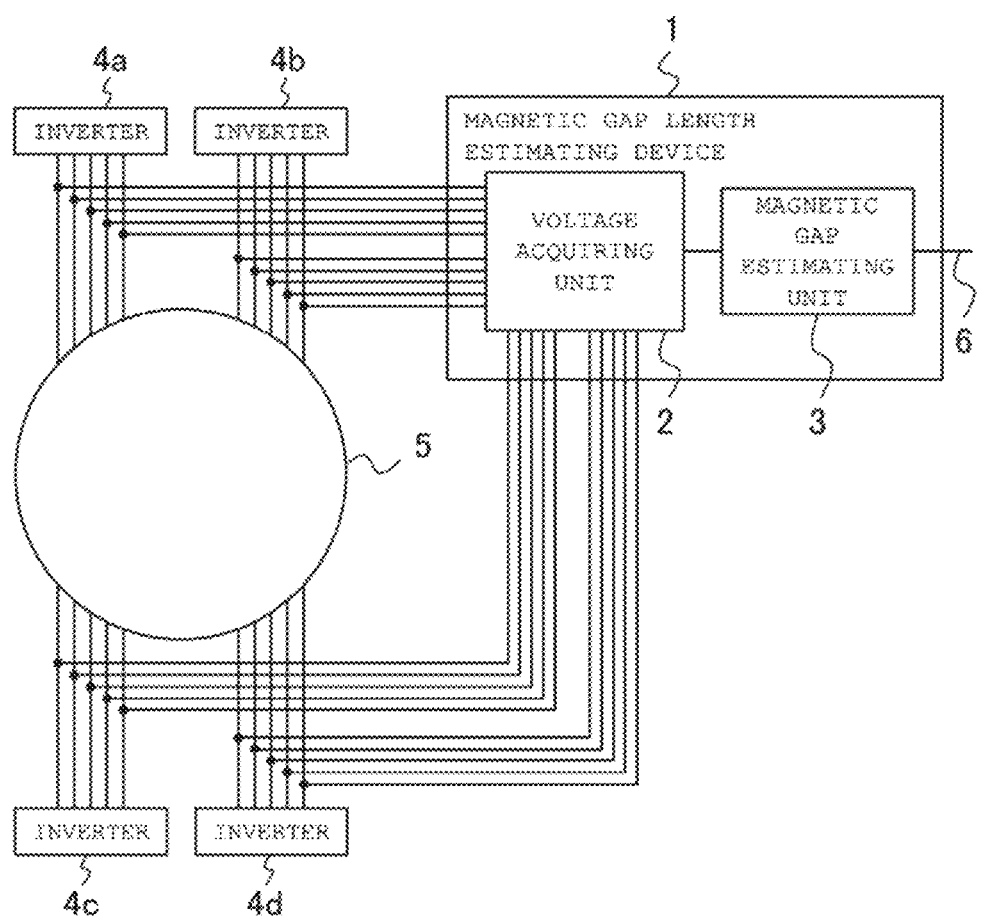
FIG. 23 is a configuration diagram of a magnetic gap length estimating device according to embodiment 5.

FIG. 23 is a configuration diagram of a magnetic gap length estimating device according to embodiment 5. The magnetic gap length estimating device according to the present embodiment is a magnetic gap length estimating device designed to perform measurement on a four-group five-phase rotating electric machine to be driven by inverters. A magnetic gap length estimating device 1 in the present embodiment has the voltage acquiring unit 2 and the magnetic gap estimating unit 3. The configuration of the magnetic gap length estimating device 1 in the present embodiment is the same as the configuration of the magnetic gap length estimating device in embodiment 1. However, the voltage acquiring unit 2 acquires voltages of 20 connection wires between the rotating electric machine 5 and four inverters 4a, 4b, 4c, and 4d. In addition, a magnetic gap length estimating method to be performed by the magnetic gap length estimating device 1 in the present embodiment partially differs from the estimating method in embodiment 1.

Figure 24:
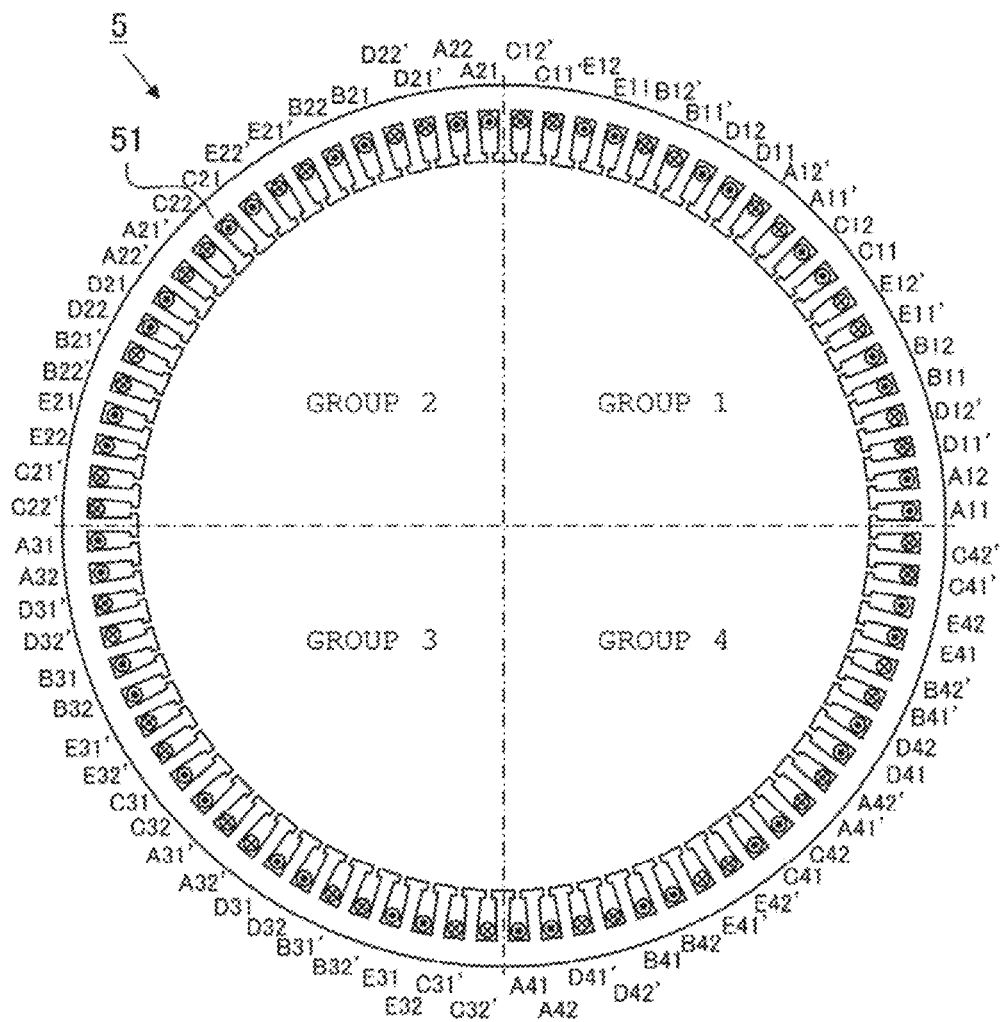
FIG. 24 is a configuration diagram of a rotating electric machine according to embodiment 5.

FIG. 24 is a configuration diagram of the rotating electric machine 5 that is subjected to measurement, in the present embodiment. The rotating electric machine 5 shown in FIG. 24 is a four-group five-phase rotating electric machine having an eight-pole eighty-slot configuration assumed to be driven by the inverters. It is noted that no rotor is shown in FIG. 24. The coils of a stator 51 form group 1 to group 4, and the groups are arranged at a phase difference, in mechanical angle, of 360/4=90°. In FIG. 24, the directions of currents flowing through the respective coils are indicated by the two types of symbols. The stator 51 of the rotating electric machine 5 in the present embodiment has a distributed-winding structure in which coils are arranged over a plurality of slots. The coils in each of the groups are formed by five phases, i.e., A, B, C, D, and E phases, and each of the phases is formed by two coils. For example, the A phase in group 1 has two coils A11 and A12. The coils in each of the groups are wound so as to be consecutive in the circumferential direction in the order of the coils of the A, D, B, E, and C phases. For example, the coils in group 1 are arranged anticlockwise in the order of A11, A12, D11, D12, B11, B12, E11, E12, C11, and C12.

That is, if a $k^{th}$ coil of an $n^{th}$ phase in an $m^{th}$ group in an M-group N-phase rotating electric machine in which each of the phases is formed by K coils is written as C(m, n, k), the rotating electric machine 5 shown in FIG. 24 satisfies $1 \leq m \leq M$, $1 \leq n \leq N$, and $1 \leq k \leq K$ and satisfies M=4, N=5, and K=2. The coils of this rotating electric machine 5 are arranged anticlockwise in the order of C(1, 1, 1), C(1, 1, 2), C(1, 2, 1), C(1, 2, 2), C(1, 3, 1), C(1, 3, 2), C(1, 4, 1), C(1, 4, 2), C(1, 5, 1), C(1, 5, 2), C(2, 1, 1), C(2, 1, 2), C(2, 2, 1), C(2, 2, 2), C(2, 3, 1), C(2, 3, 2), C(2, 4, 1), C(2, 4, 2), C(2, 5, 1), C(2, 5, 2), C(3, 1, 1), C(3, 1, 2), C(3, 2, 1), C(3, 2, 2), C(3, 3, 1), C(3, 3, 2), C(3, 4, 1), C(3, 4, 2), C(3, 5, 1), C(3, 5, 2), C(4, 1, 1), C(4, 1, 2), C(4, 2, 1), C(4, 2, 2), C(4, 3, 1), C(4, 3, 2), C(4, 4, 1), C(4, 4, 2), C(4, 5, 1), and C(4, 5, 2). Consecutive arrangement of the coils of the phases in the groups in the circumferential direction in this manner leads to increase in the difference among the amplitudes of voltage waveforms in the respective phases due to unbalance in the magnetic gap length. Increase in the difference among the amplitudes of the voltage waveforms in the respective phases leads to increase also in the difference among the $N^{th}$-order harmonic components of the respective line-to-line voltages to be used for estimating magnetic gap lengths, and thus the accuracy of magnetic gap length estimation can be increased more.

Figure 25:
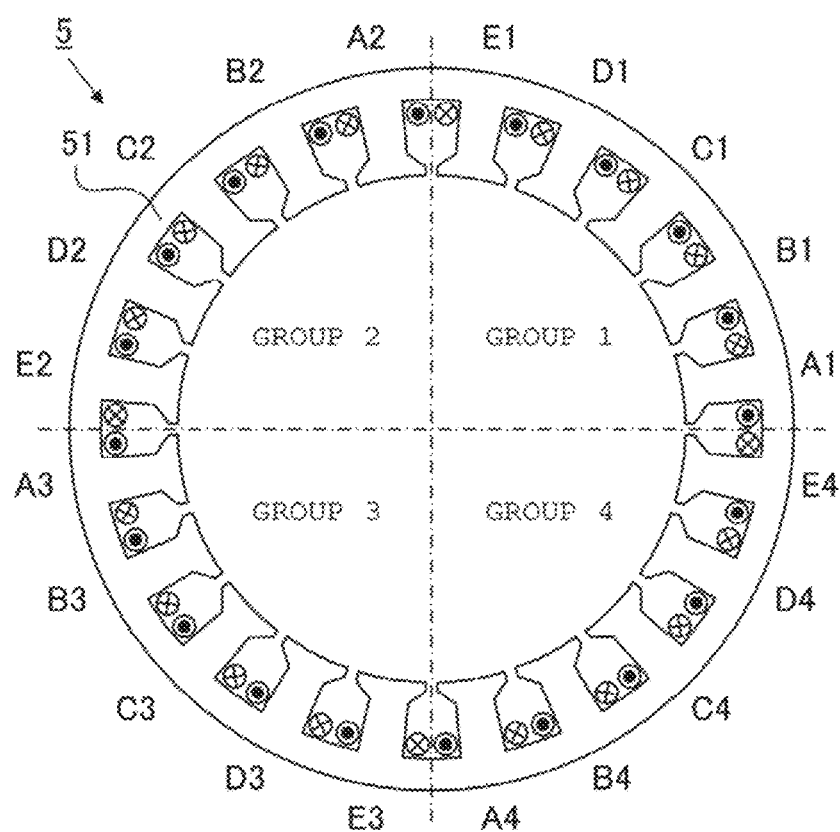
FIG. 25 is a configuration diagram of a rotating electric machine according to embodiment 5.

FIG. 25 is a configuration diagram of another rotating electric machine 5 that is subjected to measurement, in the present embodiment. The rotating electric machine 5 shown in FIG. 25 is a four-group five-phase rotating electric machine having an eight-pole twenty-slot configuration assumed to be driven by the inverters. It is noted that no rotor is shown in FIG. 25. The coils of a stator 51 form group 1 to group 4, and the groups are arranged at a phase difference, in mechanical angle, of 360/4=90°. In FIG. 25, the directions of currents flowing through the respective coils are indicated by the two types of symbols. The stator 51 of this rotating electric machine 5 has a distributed-winding structure in which coils are arranged over a plurality of slots. The coils in each of the groups are formed by five phases, i.e., the A, B, C, D, and E phases. The coils in each of the groups are wound so as to be consecutive in the circumferential direction in the order of the coils of the A, B, C, D, and E phases.

That is, if a $k^{th}$ coil of an $n^{th}$ phase in an $m^{th}$ group in an M-group N-phase rotating electric machine in which each of the phases is formed by K coils is written as C(m, n, k), the rotating electric machine 5 shown in FIG. 25 satisfies 1≤m≤M, 1≤n≤N, and 1≤k≤K and satisfies M=4, N=5, and K=1. The coils of this rotating electric machine 5 are arranged anticlockwise in the order of C(1, 1, 1), C(1, 2, 1), C(1, 3, 1), C(2, 4, 1), C(1, 5, 1), C(2, 1, 1), C(2, 2, 1), C(2, 3, 1), C(2, 4, 1), C(2, 5, 1), C(3, 1, 1), C(3, 2, 1), C(3, 3, 1), C(3, 4, 1), C(3, 5, 1), C(4, 1, 1), C(4, 2, 1), C(4, 3, 1), C(4, 4, 1), and C(4, 5, 1). Consecutive arrangement of the coils of the phases in the groups in the circumferential direction in this manner leads to increase in the difference among the amplitudes of voltage waveforms in the respective phases due to unbalance in the magnetic gap length. Increase in the difference among the amplitudes of the voltage waveforms in the respective phases leads to increase also in the difference among the $N^{th}$-order harmonic components of the respective line-to-line voltages to be used for estimating magnetic gap lengths, and thus the accuracy of magnetic gap length estimation can be increased more.

Figure 26:
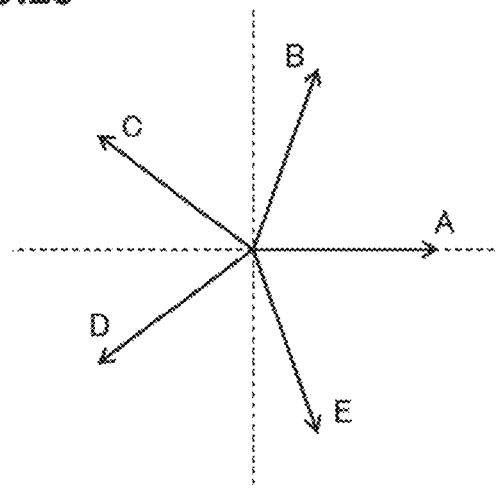
FIG. 26 is a diagram for explaining fundamental wave components of phase voltages in the rotating electric machine in embodiment 5.

FIG. 26 shows, with vectors, fundamental wave components of phase voltages in the rotating electric machine 5 in the present embodiment. The fundamental wave components of the phase voltages shown in FIG. 26 indicate vectors with no eccentricity having occurred. The electrical phase difference among the phases is 360/5=72°, and it is found that, if the relationships in FIG. 7 and FIG. 8 for embodiment 1 are applied, the phases of the fifth-order harmonic components of the phase voltages are identical to one another so that the vectors of the fifth-order harmonic components overlap with one another when no eccentricity has occurred. That is, in the rotating electric machine in the present embodiment, it is found that fifth-order harmonic components of line-to-line voltages are feature quantities obtained when the magnetic gap length becomes uneven. Thus, a magnetic gap length estimating method in the present embodiment differs from the magnetic gap length estimating method in embodiment 1 in that fifth-order harmonic components of line-to-line voltages are used. That is, in the magnetic gap length estimating device in the present embodiment, fifth-order harmonic components are used as the $N^{th}$-order harmonic components in step S4 and step S5 of the flowchart in FIG. 6 for embodiment 1. The other features are the same as those in embodiment 1.

Similar to embodiment 1, neither a current sensor nor a current load is necessary, and a voltage at a connection-wire neutral point does not need to be measured, also in the magnetic gap length estimating device that is thus configured.

It is noted that the voltage acquiring unit of the magnetic gap length estimating device is connected to all the 20 connection wires of four-group five-phase windings in the present embodiment. If the voltage acquiring unit is connected to at least two of the five connection wires in each of the groups, the magnetic gap length estimating device in the present embodiment can estimate magnetic gap lengths although the number of measurement points decreases.

Embodiment 6

Figure 27:
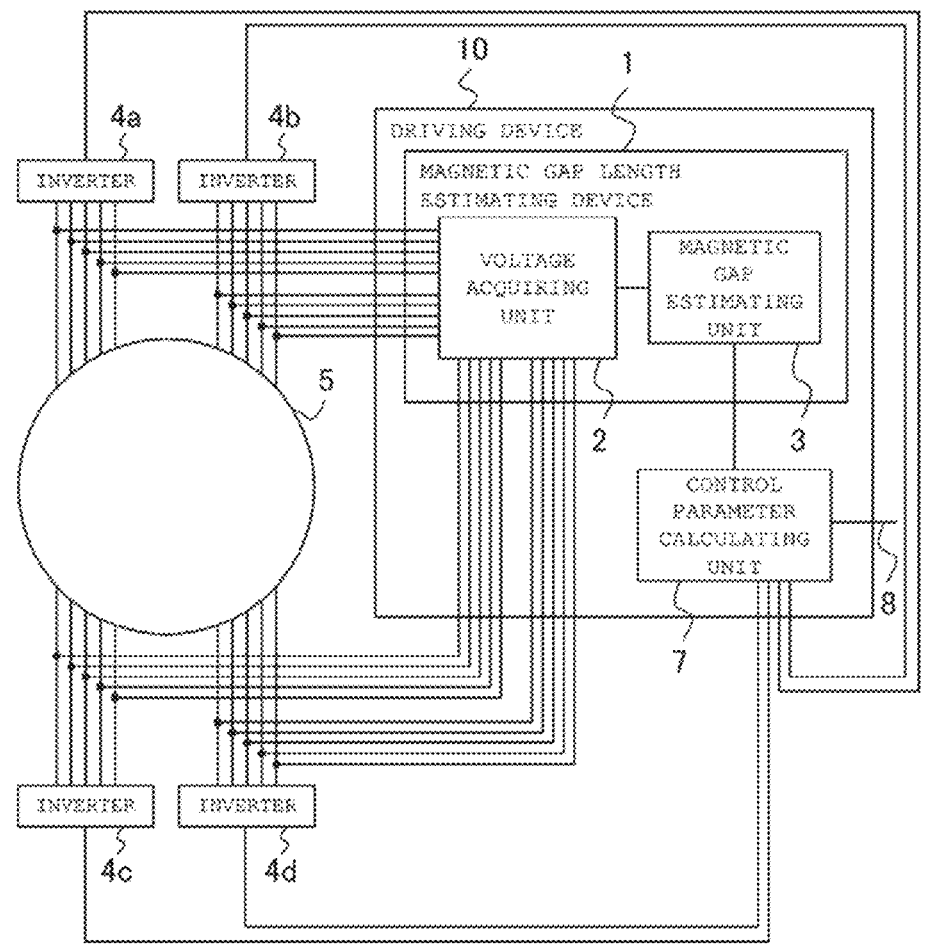
FIG. 27 is a configuration diagram of a driving device for the rotating electric machine according to embodiment 6.

FIG. 27 is a configuration diagram of a driving device for the rotating electric machine according to embodiment 6. A driving device 10 for the rotating electric machine in the present embodiment has: the magnetic gap length estimating device 1 in embodiment 5; and the control parameter calculating unit 7 which sends control parameters to the four inverters 4a, 4b, 4c, and 4d. The control parameter calculating unit 7 sends, on the basis of the magnetic gap lengths estimated by the magnetic gap length estimating device 1, control parameters for adjusting current input values for the respective groups of the rotating electric machine 5 to the four respective inverters 4a, 4b, 4c, and 4d. In addition, the control parameter calculating unit 7 has an external output terminal 8. If, for example, an external monitor is connected to the external output terminal 8, the state of the magnetic gap and the control parameters can be visualized.

For example, if the rotating electric machine 5 suffers static eccentricity in a direction of reduction of the magnetic gap length in group 3, a current input value for each of the coils belonging to group 3 is set to be smaller than a current input value for each of the coils belonging to group 1, group 2, and group 4. By thus performing control, vibration and noise due to the eccentricity can be reduced.

It is noted that the voltage acquiring unit of the magnetic gap length estimating device is connected to all the 20 connection wires of the four-group five-phase windings in the present embodiment. If the voltage acquiring unit is connected to at least one of the five connection wires in each of the groups, the driving device for the rotating electric machine in the present embodiment can calculate control parameters by estimating a direction of displacement of the magnetic gap length although the number of measurement points decreases.

The magnetic gap length estimating devices described in embodiments 1 and 3 to 5 use third-order harmonic components of line-to-line voltages with respect to a three-group three-phase or one-group three-phase rotating electric machine, use sixth-order harmonic components of line-to-line voltages with respect to a one-group six-phase rotating electric machine, and use fifth-order harmonic components of line-to-line voltages with respect to a four-group five-phase rotating electric machine, to estimate magnetic gap lengths. The magnetic gap length estimating devices described above can estimate magnetic gap lengths with use of $N^{r}h$-order harmonic components of line-to-line voltages in an M-group N-phase rotating electric machine as a rotating electric machine other than those described above.

In addition, if a $k^{th}$ coil of an $n^{th}$ phase in an $m^{th}$ group in an M-group N-phase rotating electric machine in which each of the phases is formed by K coils is written as C(m, n, k), $1 \leq m \leq M$, $1 \leq n \leq N$, and $1 \leq k \leq K$ are satisfied, anticlockwise spatial arrangement of the coils in the order of C (1, 1, 1), C (1, 1, 2), . . . C (1, 1, K), C (1, 2, 1), . . . C(1, 2, K), . . . C(1, N, K), C(2, 1, 1), . . . , and C(M, N, K) leads to increase in the difference among the amplitudes of voltage waveforms in the respective phases due to unbalance in the magnetic gap length. Increase in the difference among the amplitudes of the voltage waveforms in the respective phases leads to increase also in the difference among the $N^{th}$-order harmonic components of the respective line-to-line voltages to be used for estimating magnetic gap lengths, and thus the accuracy of magnetic gap length estimation can be increased more.

Figure 28:
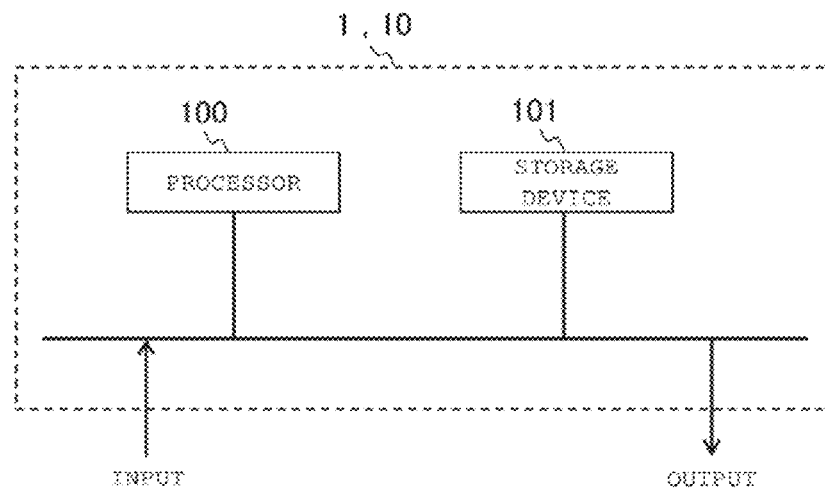
FIG. 28 is a schematic diagram showing an example of hardware of any of the magnetic gap length estimating devices and the driving devices for the rotating electric machines according to embodiments 1 to 6.

It is noted that each of the magnetic gap length estimating devices 1 according to embodiments 1 and 3 to 5 and the driving devices 10 for the rotating electric machines in embodiments 2 and 6 is composed of a processor 100 and a storage device 101, an example of hardware of the device being shown in FIG. 28. Although not shown, the storage device 101 includes a volatile storage device such as a random access memory and a nonvolatile auxiliary storage device such as a flash memory. Alternatively, the storage device may include, as the auxiliary storage device, a hard disk instead of a flash memory. The processor 100 executes a program inputted from the storage device 101. In this case, the program is inputted from the auxiliary storage device via the volatile storage device to the processor 100. Further, the processor 100 may output data such as a computation result to the volatile storage device of the storage device 101 or may save the data via the volatile storage device into the auxiliary storage device.

Although the disclosure is described above in terms of various exemplary embodiments, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the specification of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 magnetic gap length estimating device
2 voltage acquiring unit
3 magnetic gap estimating unit
4a, 4b, 4c, 4d inverter
5 rotating electric machine
6, 8 external output terminal
7 control parameter calculating unit
10 driving device
31 memory unit
32 basic characteristic storing unit
33 estimation reference storing unit
34 analysis unit
35 estimating-and-calculating unit
36 calculation result storing unit
37 spectrum analysis unit
38 frequency analysis unit
51 stator
52 rotor
100 processor
101 storage device

The invention claimed is:

1. A magnetic gap length estimating device for estimating a magnetic gap length in an M-group N-phase rotating electric machine to be driven by an inverter where M represents a natural number and N represents a natural number not smaller than 2, the rotating electric machine being formed by connection wires with a phase difference in electrical angle among phases being 360/N degrees, the magnetic gap length estimating device comprising:
   a voltage acquiring circuitry which acquires a no-load-induced line-to-line voltage induced between the connection wires under no load; and
   a magnetic gap estimating circuitry which estimates the magnetic gap length, wherein
   the magnetic gap estimating circuitry includes
      a spectrum analysis circuitry which converts the no-load-induced line-to-line voltage acquired by the voltage acquiring circuitry into amplitudes and phases for respective frequencies,
      a frequency analysis circuitry which extracts amplitudes and phases of a fundamental wave component and an $N^{th}$-order harmonic component of the no-load-induced line-to-line voltage from among the amplitudes and the phases, for the respective frequencies, that have been obtained through the conversion by the spectrum analysis circuitry, and
      an estimating-and-calculating circuitry which estimates the magnetic gap length from the amplitudes and the phases, of the fundamental wave component and the $N^{th}$-order harmonic component of the no-load-induced line-to-line voltage, that have been extracted by the frequency analysis circuitry.

2. The magnetic gap length estimating device according to claim 1, the rotating electric machine having groups which are formed by coils arranged such that a phase difference in mechanical angle is 360/M degrees.

3. The magnetic gap length estimating device according to claim 2, the rotating electric machine being such that,
   if
      the rotating electric machine has M groups each having N phases,
      each of the phases is formed by K said coils where K represents a natural number, and
      a $k^{th}$ one of the coils of an $n^{th}$ phase in an $m^{th}$ group is written as C (m, n, k),
   $1 \leq m \leq M$, $1 \leq n \leq N$, and $1 \leq k \leq K$ are satisfied, and the coils are spatially arranged anticlockwise in an order of C(1, 1, 1), C(1, 1, 2), . . . C(1, 1, K), C(1, 2, 1), . . . C(1, 2, K), . . . C(1, N, K), C(2, 1, 1), . . . , and C(M, N, K).

4. The magnetic gap length estimating device according to claim 2, the coils in each of the groups of the rotating electric machine being connected in Y connection in which series connection is made in each of the phases.

5. The magnetic gap length estimating device according to claim 4, the rotating electric machine being such that neutral points of the respective groups in each of which the Y connection is made are electrically connected to each other.

6. The magnetic gap length estimating device according to claim 1, wherein the estimating-and-calculating circuitry has an external output terminal through which a result of estimation is outputted to outside.

7. A driving device for a rotating electric machine, the driving device comprising:
the magnetic gap length estimating device according to claim 1; and
a control parameter calculating circuitry which calculates a control parameter for the inverter on the basis of the magnetic gap length estimated by the magnetic gap length estimating device.

8. The driving device for the rotating electric machine, according to claim 7, wherein the control parameter calculating circuitry has an external output terminal through which a calculation result is outputted to outside.

9. A magnetic gap length estimating method for estimating a magnetic gap length in an M-group N-phase rotating electric machine to be driven by an inverter where M represents a natural number and N represents a natural number not smaller than 2, the rotating electric machine being formed by connection wires with a phase difference in electrical angle among phases being 360/N degrees, the magnetic gap length estimating method comprising:
a voltage acquiring step of acquiring a no-load-induced line-to-line voltage induced between the connection wires under no load; and
a magnetic gap estimating step of estimating the magnetic gap length, wherein
the magnetic gap estimating step includes
a spectrum analysis step of converting the no-load-induced line-to-line voltage acquired in the voltage acquiring step into amplitudes and phases for respective frequencies,
a frequency analysis step of extracting amplitudes and phases of a fundamental wave component and an $N^{th}$-order harmonic component of the no-load-induced line-to-line voltage from among the amplitudes and the phases, for the respective frequencies, that have been obtained through the conversion in the spectrum analysis step, and
an estimating-and-calculating step of estimating the magnetic gap length from the amplitudes and the phases, of the fundamental wave component and the $N^{th}$-order harmonic component of the no-load-induced line-to-line voltage, that have been extracted in the frequency analysis step.

10. The magnetic gap length estimating method according to claim 9, wherein
the estimating-and-calculating step includes
a first step of estimating an absolute value of a displacement amount of the magnetic gap length from the amplitude of the $N^{th}$-order harmonic component of the no-load-induced line-to-line voltage, and
a second step of
determining that the displacement amount of the magnetic gap length has a negative sign, if a phase difference between the $N^{th}$-order harmonic component of the no-load-induced line-to-line voltage and an $N^{th}$-order harmonic component of a phase voltage is not smaller than 90° and smaller than 270°, or
determining that the displacement amount of the magnetic gap length has a positive sign, if the phase difference is not smaller than 0° and smaller than 90°, or not smaller than 270° and smaller than 360°.

11. A driving device for an M-group N-phase rotating electric machine to be driven by an inverter where M represents a natural number and N represents a natural number not smaller than 2, the rotating electric machine being formed by connection wires with a phase difference in electrical angle among phases being 360/N degrees, the driving device comprising:
a voltage acquiring circuitry which acquires a no-load-induced line-to-line voltage induced between the connection wires under no load;
a magnetic gap estimating circuitry which estimates a magnetic gap length in the rotating electric machine, the magnetic gap estimating circuitry including
a spectrum analysis circuitry which converts the no-load-induced line-to-line voltage acquired by the voltage acquiring circuitry into amplitudes and phases for respective frequencies,
a frequency analysis circuitry which extracts amplitudes and phases of a fundamental wave component and an $N^{th}$-order harmonic component of the no-load-induced line-to-line voltage from among the amplitudes and the phases, for the respective frequencies, that have been obtained through the conversion by the spectrum analysis circuitry, and
an estimating-and-calculating circuitry which estimates the magnetic gap length from the amplitudes and the phases, of the fundamental wave component and the $N^{th}$-order harmonic component of the no-load-induced line-to-line voltage, that have been extracted by the frequency analysis circuitry; and
a control parameter calculating circuitry which calculates a control parameter for the inverter on the basis of the magnetic gap length estimated by the magnetic gap estimating circuitry.

12. The driving device for the rotating electric machine, according to claim 11, wherein the control parameter calculating circuitry has an external output terminal through which a calculation result is outputted to outside.

* * * * *